(12) United States Patent
Takizawa et al.

(10) Patent No.: US 6,381,091 B1
(45) Date of Patent: Apr. 30, 2002

(54) DISK DRIVE APPARATUS

(75) Inventors: Teruyuki Takizawa; Kenji Akimaru, both of Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/359,209

(22) Filed: Jul. 22, 1999

(30) Foreign Application Priority Data

Jul. 23, 1998 (JP) ............................................ 10-207958
Jan. 11, 1999 (JP) ............................................ 11-004728

(51) Int. Cl.⁷ ............................................... G11B 17/00
(52) U.S. Cl. ................................................... 360/97.01
(58) Field of Search ........................... 360/97.01–97.04

(56) References Cited

U.S. PATENT DOCUMENTS 5,214,549 A * 5/1993 Baker et al. ............. 360/97.02
5,349,486 A * 9/1994 Sugimoto et al. ........ 360/97.01
5,917,676 A * 6/1999 Browning ................ 360/97.01
6,172,842 B1 * 1/2001 Satoh et al. ............. 360/97.01

FOREIGN PATENT DOCUMENTS

| JP | 6-74299 | 3/1994 |
|----|---------|--------|
| JP | 8-72098 | 3/1996 |
| JP | 8-286623 | 11/1996 |
| JP | 9-8470 | 1/1997 |
| JP | 9-95722 | 1/1997 |
| JP | 9-73039 | 3/1997 |

* cited by examiner

Primary Examiner—Allen Cao
(74) Attorney, Agent, or Firm—Ratner & Prestia

(57) ABSTRACT

A disk drive apparatus of the present invention, includes: a movable portion, a stationary portion disposed around the movable portion, and a damping portion disposed between the movable portion and the stationary portion, for connection therebetween, the movable portion, the stationary portion, and the damping portion being disposed substantially in a plane, wherein a head for performing at least one of recording or reproducing information with respect to a disk, a head drive portion for moving the head, and a rotation drive portion for driving a disk are provided on the movable portion.

29 Claims, 22 Drawing Sheets

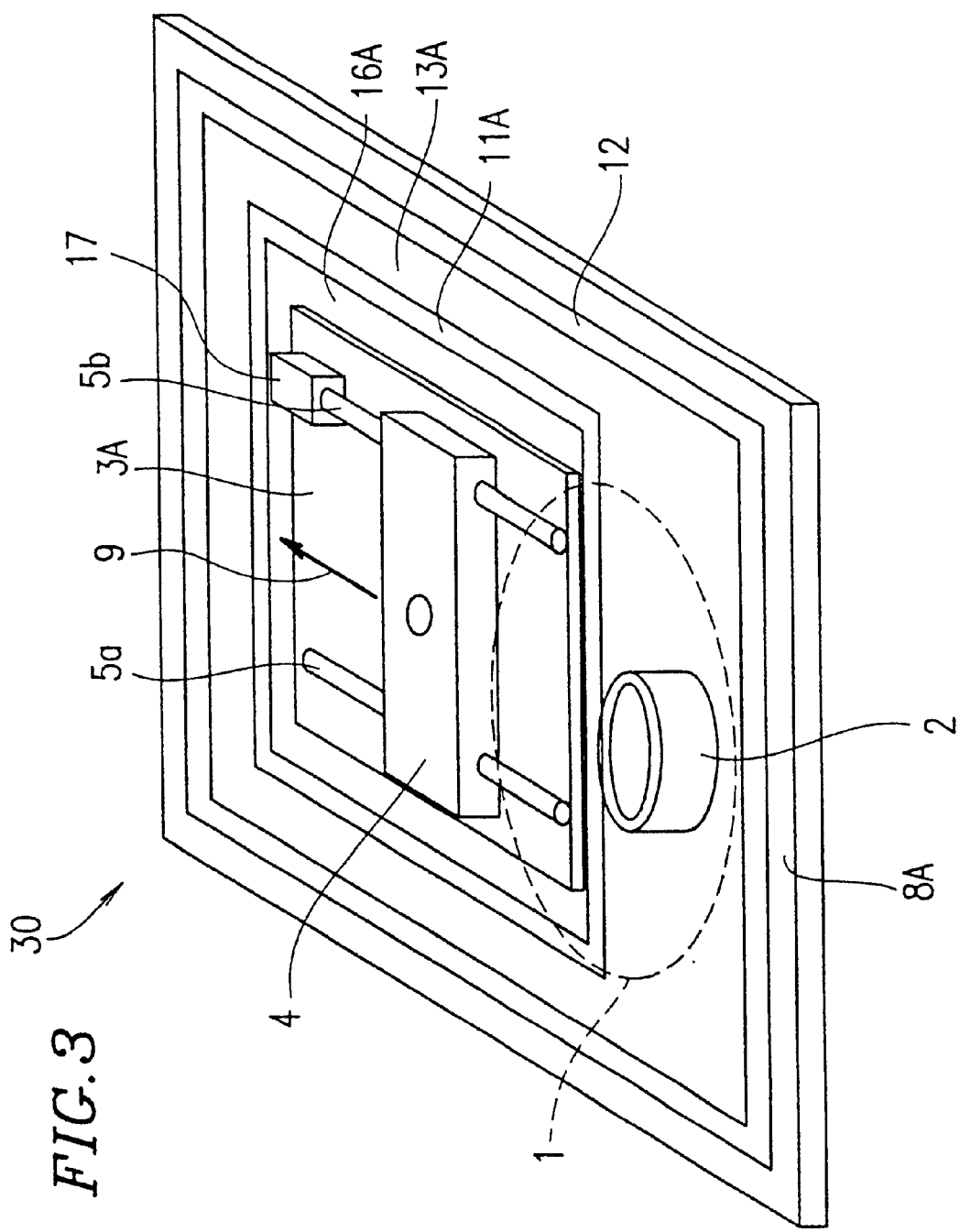

Frequency characteristics of a damping portion
(Tracking direction)

Frequency characteristics of a damping portion
(Focus direction)

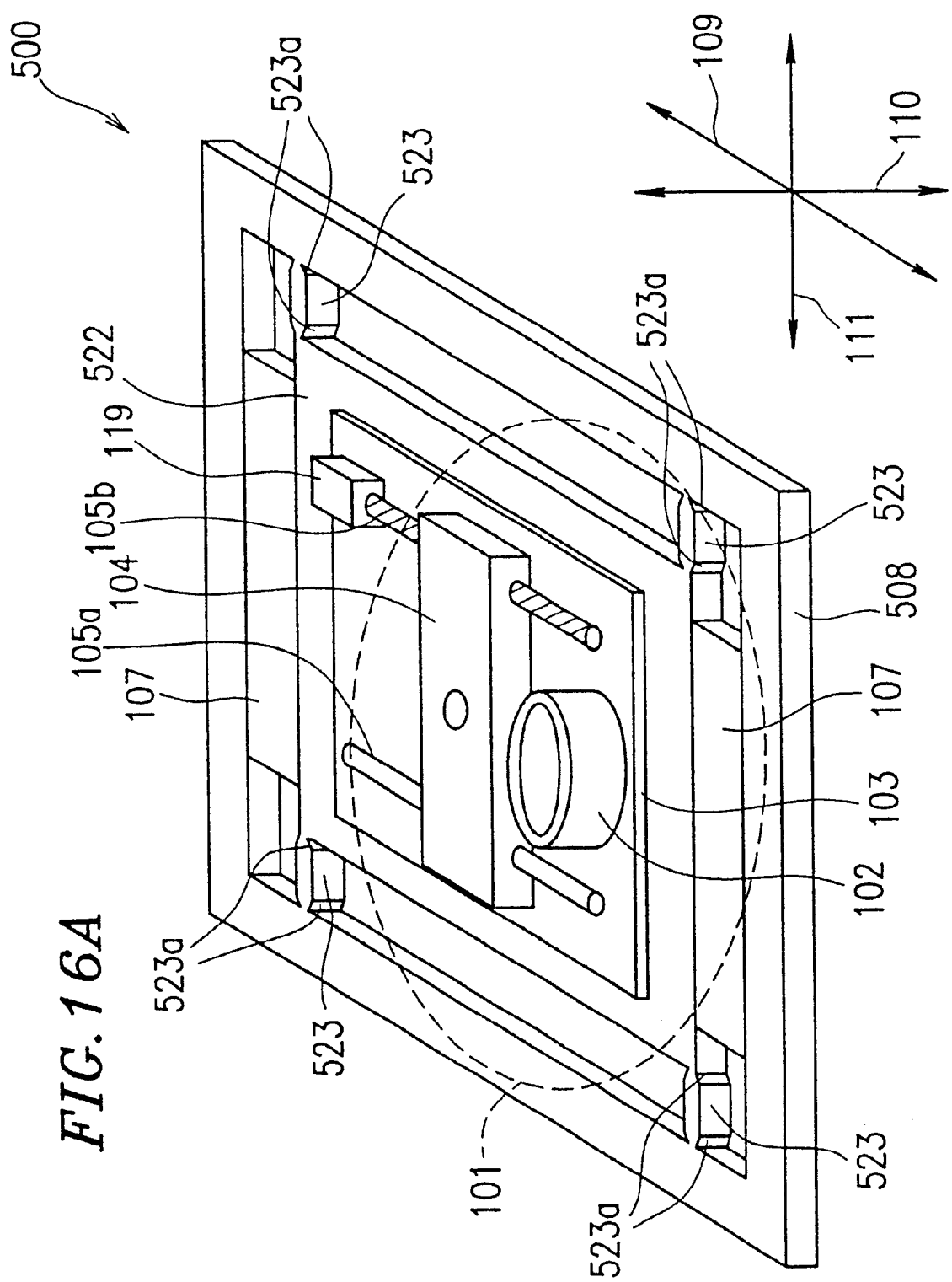

DISK DRIVE APPARATUS

BACKGROUND OF THE INVENTION

1. Field of the Invention

The present invention relates to a disk drive apparatus for performing at least one of recording information onto or reproducing information from a recording medium, for example, a disk. In particular, the present invention relates to a disk drive apparatus provided with a damping mechanism.

2. Description of the Related Art

FIG. 21 is a perspective exploded view showing a conventional damping mechanism in a disk drive apparatus. As shown in FIG. 21, a disk drive motor 1002 for driving a disk 1001 is fixed onto a base 1003, and two guide axes 1005 are fixed onto the base 1003 so as to be parallel to each other. Furthermore, a recording/reproducing head 1004 for recording information onto or reproducing information from the disk 1001 is supported by the guide axes 1005 so as to move in a radial direction (represented by an arrow 1009) of the disk 1001. The base 1003 is fixed onto a chassis 1008 via damping portions 1007 made of rubber resin disposed at four corners. The damping portions 1007 are fixed between the chassis 1008 and the base 1003 with screws (not shown) or the like.

The damping function in a conventional disk drive apparatus with the above-mentioned structure will be described.

The recording/reproducing head 1004 moves in the radial direction 1009 along the disk 1001 which rotates at a high speed, thereby recording information onto or reproducing information from the disk 1001. At this time, the high-speed rotation of the disk 1001 and the high-speed movement of the recording/reproducing head 1004 in the radial direction 1009 cause mechanical vibrations.

Thus, in a disk drive apparatus requiring low noise and low vibrations, in order to prevent the above-mentioned mechanical vibrations from being propagated to outside the apparatus, attempts have been made to attenuate the mechanical vibrations by using the damping portions 1007.

Attempts have also been made to attenuate the mechanical vibrations by using the damping portions 1007 for the purpose of enhancing vibration resistance and shock resistance of the disk drive apparatus, i.e., for the purpose of minimizing the propagation of the mechanical vibrations of the chassis 1008 (caused by shock and vibrations outside the apparatus) to the recording/reproducing head 1004, and the like.

In a recording/reproducing apparatus for recording/reproducing information with respect to a hard disk, an optical disk, or the like, a higher density of information recorded on the disk, a larger amount of space of the disk, a higher data transfer speed involved in high-speed rotation of the disk, and a shorter access time are desired. Furthermore, recently, in order to adapt to a note-size personal computer, there has been a demand for a thinner disk drive apparatus with decreased power consumption and lower noise.

It is desired to substantially enhance tracking control precision of the recording/reproducing head, along with a higher density of information recorded on the disk and a higher capacity of the disk. However, by doing so, the mechanical vibrations caused by the high-speed rotation and high-speed access of the disk in the disk drive apparatus cause external disturbance vibrations, resulting in a decrease in tracking control precision. on the other hand, there has been a demand for a thinner disk drive apparatus with decreased power consumption and lower noise.

Therefore, in a disk drive apparatus, it is desired to provide a damping mechanism for efficiently suppressing internal vibrations and enhancing vibration resistance and shock resistance in a limited available space.

In the conventional damping mechanism shown in FIG. 21, the damping portions 1007 are fixed between the chassis 1008 and the base 1003 with screws (not shown) or the like. Therefore, it is difficult to render the disk drive apparatus thinner by incorporating such a conventional damping mechanism. Furthermore, the available space of the damping portions 1007 tends to be reduced, which makes it difficult to increase a design flexibility. Consequently, the effect of attenuating vibrations of the damping portions 1007 is degraded.

Furthermore, considering horizontal and vertical setting conditions of a disk drive apparatus, and that various conditions of the mechanical vibrations caused by the movement of the recording/reproducing head 1004 are concentrated in the radial direction 1009, it is required to provide the vibration attenuating characteristics of the damping portions 1007 with anisotropy, by rendering an intrinsic vibration frequency of the damping portions 1007 in the radial direction 1009 different from that of the damping portions 1007 in a tangential direction (represented by an arrow 1014) orthogonal to the radial direction 1009. However, in the case of using substantially spherical damping portions 1007 as shown in FIG. 21, it is difficult to realize anisotropy of the intrinsic vibration frequency between the radial direction 1009 and the tangential direction 1014. Accordingly, a damping effect is not sufficient.

Furthermore, there is a limit to a space accommodating vibrations of the disk drive apparatus, so that the base 1003 should be disposed substantially horizontal. However, in general, the center of gravity of the base 1003 on which the disk drive motor 1002 and the recording/reproducing head 1004 are disposed is likely to be biased toward the disk drive motor 1002. Therefore, in the conventional damping mechanism, the damping portions 1007 of which material or shape is varied depending upon the setting position, are disposed, whereby a horizontal posture of the base 1003 is realized. However, this increases the kinds of the damping portions 1007. Furthermore, different kinds of damping portions 1007 may be mixed during assembly of the apparatus, which makes it necessary to classify them.

SUMMARY OF THE INVENTION

A disk drive apparatus of the present invention, includes: a movable portion, a stationary portion disposed around the movable portion, and a damping portion disposed between the movable portion and the stationary portion for connection therebetween, the movable portion, the stationary portion, and the damping portion being disposed substantially in a plane, wherein a head for performing at least one of recording or reproducing information with respect to a disk, a head drive portion for moving the head, and a rotation drive portion for driving a disk are provided on the movable portion.

In one embodiment of the present invention, the stationary portion is disposed so as to surround the movable portion, an annular gap in formed between the movable portion and the stationary portion, and the damping portion has an annular shape and is disposed in the annular gap.

In another embodiment of the present invention, the damping portion partially connects the movable portion to the stationary portion.

In another embodiment of the present invention, the damping portion includes a first damping portion connected to the movable portion, a second damping portion connected to the stationary portion, and an intermediate movable portion connecting the first damping portion to the second damping portion.

In another embodiment of the present invention, the damping portion is made of rubber resin or silicon resin.

In another embodiment of the present invention, the damping portion is made of a thermoplastic elastomer.

In another embodiment of the present invention, the movable portion and the stationary portion are made of synthetic resin such as ABS resin and PBT resin.

In another embodiment of the present invention, the intermediate movable portion is made of synthetic resin such as ABS resin or PBT resin.

In another embodiment of the present invention, the damping portion includes a plurality of portions having intrinsic vibration frequencies which are different from each other.

A disk drive apparatus of the present invention, includes: a plurality of movable portions disposed separately, a stationary portion having a plurality of openings surrounding the respective movable portions, and a plurality of damping portions which are disposed between the movable portions and inner peripheries of the openings and connect the movable portions to the inner peripheries of the openings, each of the movable portions, each of the openings of the stationary portion, and each of the damping portions being disposed substantially in a plane, wherein a base is connected to each of the movable portions, and a head for performing at least one of recording or reproducing information with respect to a disk, a head drive portion for moving the head, and a rotation drive portion for driving the disk are provided on the base.

In one embodiment of the present invention, an annular gap is formed between each of the movable portions and the inner periphery of each opening of the stationary portion, and each of the damping portions has an annular shape and is disposed in each of the annular gaps.

In another embodiment of the present invention, each of the damping portions partially connects each of the movable portions to the inner periphery of each of the openings of the stationary portion.

In another embodiment of the present invention, each of the damping portions includes a first damping portion connected to each of the movable portions, a second damping portion connected to the inner periphery of each of the openings of the stationary portion, and an intermediate movable portion for connecting the first damping portion to the second damping portion.

In another embodiment of the present invention, each of the damping portions is made of rubber resin or silicon resin.

In another embodiment of the present invention, each of the damping portions is made of a thermoplastic elastomer.

In another embodiment of the present invention, each of the movable portions and the stationary portion are made of synthetic resin such as ABS resin and PBT resin.

In another embodiment of the present invention, each of the intermediate movable portions is made of synthetic resin such as ABS resin and PBT resin.

In another embodiment of the present invention, each of the damping portions includes a plurality of portions having intrinsic vibration frequencies which are different from each other.

A disk drive apparatus of the present invention, includes: a movable portion, a stationary portion disposed around the movable portion, and a damping portion and a connecting portion which are disposed between the movable portion and the stationary portion for connection therebetween, the movable portion, the stationary portion, and the damping portion being disposed substantially in a plane, wherein a head for performing at least one of recording or reproducing information with respect to a disk, a head drive portion for moving the head in a predetermined direction, and a rotation drive portion for driving the disk are provided on the movable portion.

In one embodiment of the present invention, the connecting portion is disposed substantially in the plane together with the movable portion, the stationary portion, and the damping portion.

In another embodiment of the present invention, the connecting portion has a first intrinsic vibration frequency in a first direction and a second intrinsic vibration frequency in a second direction which is different from the first direction, wherein the first intrinsic vibration frequency is lower than the second intrinsic vibration frequency.

In another embodiment of the present invention, the first direction and the second direction are different from each other, and are either of a direction substantially parallel to the plans or a direction substantially orthogonal to the plane.

In another embodiment of the present invention, the first direction and the second direction are different from each other, and are either of a movement direction of the head, a thickness direction of the disk, or a direction substantially orthogonal to the movement direction of the head and the thickness direction of the disk.

In another embodiment of the present invention, the damping portion is made of thermosetting resin or thermoplastic resin.

In another embodiment of the present invention, the connecting portion includes a flat spring.

In another embodiment of the present invention, the connecting portion contains resin.

In another embodiment of the present invention, the connecting portion includes a first pivot portion which pivots with respect to the stationary portion, and a second pivot portion which pivots with respect to the movable portion.

In another embodiment of the present invention, the stationary portion, the movable portion, and the connecting portion are integrally formed with resin.

In another embodiment of the present invention, the connecting portion includes a first cross-sectional portion and a second cross-sectional portion, and the second cross-sectional portion is formed in such a manner that the first intrinsic vibration frequency is lower than the second intrinsic vibration frequency.

In another embodiment of the present invention, a cross-sectional area of the second cross-sectional portion is smaller than a cross-sectional area of the first cross-sectional portion.

In another embodiment of the present invention, the second cross-sectional portion is formed on both ends of the connecting portion.

In another embodiment of the present invention, the second cross-sectional portion is formed at a center of the connecting portion.

According to the structure of the present invention, a space in a height direction of a disk drive apparatus is sufficiently decreased, whereby the disk drive apparatus can be rendered planar. A design flexibility of a damping mechanism can be increased even in a thin disk drive apparatus. Furthermore, only by changing the thickness and width of the damping portion, an effect of attenuating vibrations with anisotropy can be realized. Even when a movable portion with a biased center of gravity is vibrated while being maintained horizontal, the space accommodating vibrations of the movable portion can be minimized without increasing the number of components of the damping portion. Thus, internal vibrations are efficiently suppressed, and vibration resistance and shook resistance can be sufficiently kept.

The disk drive apparatus of the present invention can sufficiently keep vibration resistance and shock resistance; therefore, it becomes possible to satisfactorily record/reproduce information with respect to a disk.

Thus, the invention described herein makes possible the advantage of: providing a disk drive apparatus which is capable of increasing a design flexibility of a damping mechanism in a thin disk drive apparatus, realizing an effect of attenuating vibrations with anisotropy, minimizing a space accommodating vibrations of a movable portion with a biased center of gravity without increasing the number of components in damping portions, and sufficiently keeping vibration resistance and shock resistance.

These and other advantages of the present invention will become apparent to those skilled in the art upon reading and understanding the following detailed description with reference to the accompanying figures.

BRIEF DESCRIPTION OF THE DRAWINGS

FIG. 3 is a perspective view of Embodiment 3 of a disk drive apparatus according to the present invention.

FIG. 16A is a perspective view of Embodiment 14 of a disk drive apparatus according to the present invention.

DESCRIPTION OF THE PREFERRED EMBODIMENTS

Figure 1A:
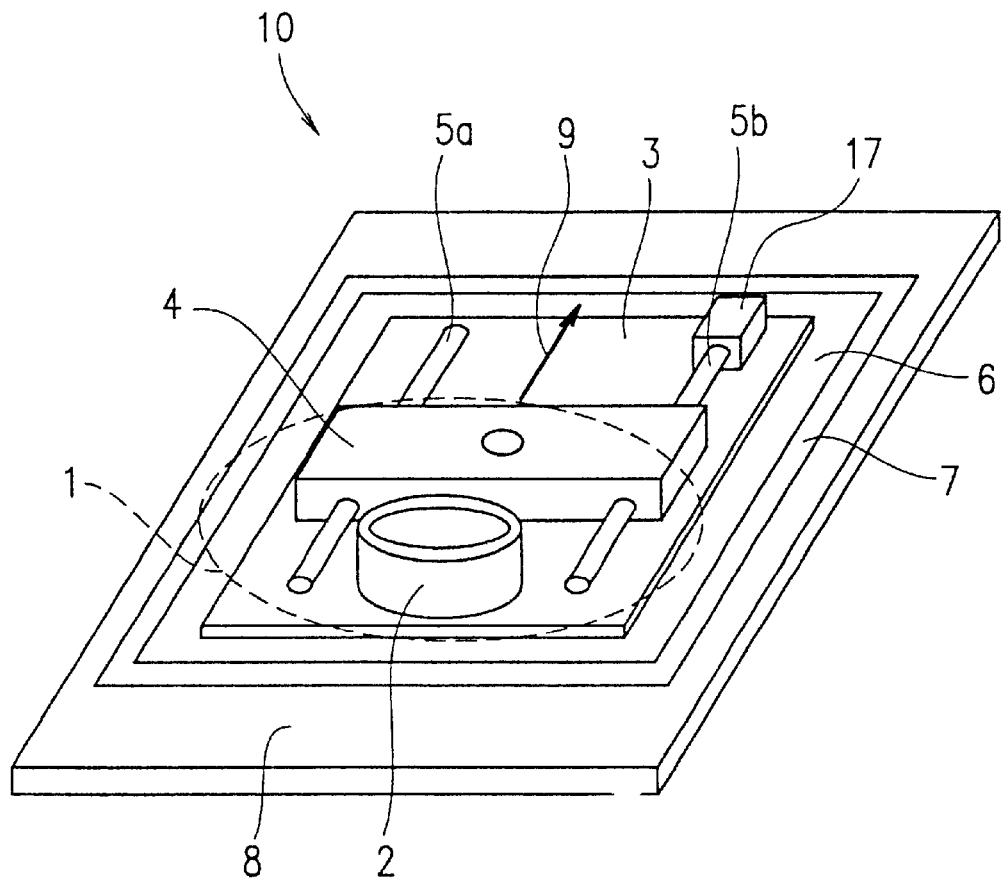
FIG. 1A is a perspective view of Embodiment 1 of a disk drive apparatus according to the present invention.

Hereinafter, the present invention will be described by way of illustrative embodiments with reference to the drawing.

Embodiment 1

Figure 1B:
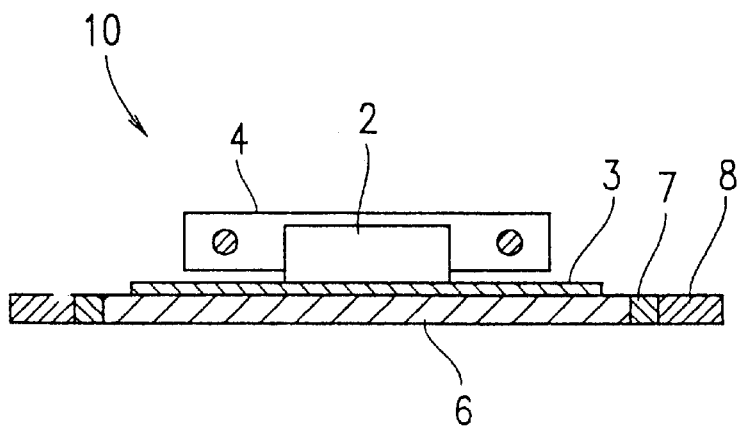
FIG. 1B is a cross-sectional view of the disk drive apparatus in FIG. 1A.

FIG. 1A is a perspective view of Embodiment 1 of a disk drive apparatus 10 of the present invention. FIG. 1B is a cross-sectional view thereof.

Referring to FIGS. 1A and 1B, a disk drive motor 2 is fixed onto a base 3, and two guide axes 5a and 5b are fixed onto the bass 3. A recording/reproducing head 4 is supported by the guide axes 5a and 5b so as to move in a radial direction 9 of a disk 1. The guide axis 5b is a screw, with which an and portion of the recording/reproducing head 4 is engaged. The recording/reproducing head 4 is moved by allowing the guide axis 5b to pivot by a movement drive portion 17.

The bottom of the base 3 in fixed onto a movable portion 6 having a plate shape in plans, made of synthetic resin such as ABS resin and PBT resin. An annular damping portion 7 having a rectangular shape in plane, made of rubber resin or silicon resin is fixed around an outer periphery of the movable portion 6. Furthermore, an annular chassis 8 having a rectangular shape in plans, made of synthetic resin is fixed around an outer periphery of the damping portion 7. The chassis a in fixed onto an apparatus body, and the movable portion 6 is movable with respect to the chassis 8 via the damping portion 7.

The movable portion 6, the damping portion 7, and the chassis 8 can be integrally molded with resin, and at least a part of the inner and outer peripheries should be fixed to each other. The movable portion 6, the damping portion 7, and the chassis 8 should be fixed to each other by appropriately selecting a method in accordance with the material of each portion. The movable portion 6, the damping portion 7, and the chassis 8 may be mechanically engaged with each other or may be fixed to each other with an adhesive. The base 3 and the movable portion 6 may be formed of the same material.

The damping function of Embodiment 1 of the disk drive apparatus as constructed above will be described.

The recording/reproducing head 4 for recording/reproducing information with respect to the disk 1 which is rotated at a high speed is moved at a high speed in the radial direction 9 by the movement drive portion 17, thereby recording/reproducing information with respect to the disk 1. At this time, the high-speed rotation of the disk 1 and the high-speed movement of the recording/reproducing head 4 in the radial direction 9 cause mechanical vibrations.

Therefore, the mechanical vibrations are attenuated by the damping portion 7 so as to minimize the propagation of the mechanical vibrations in the apparatus to outside the apparatus. Furthermore, in order to minimize the propagation of the mechanical vibrations of the chassis 8 caused by shock and vibrations outside the apparatus to inside the apparatus, the mechanical vibrations are attenuated by the damping portion 7.

The above-mentioned damping function is similar to that of a conventional damping mechanism. However, the damping portion 7 substantially in an annular shape, the movable portion 6, and the chassis 8 are integrated so as to be planar so that the disk drive apparatus can be rendered thin, and a design flexibility of the damping portion 7 can be increased.

Embodiment 2

Figure 2A:
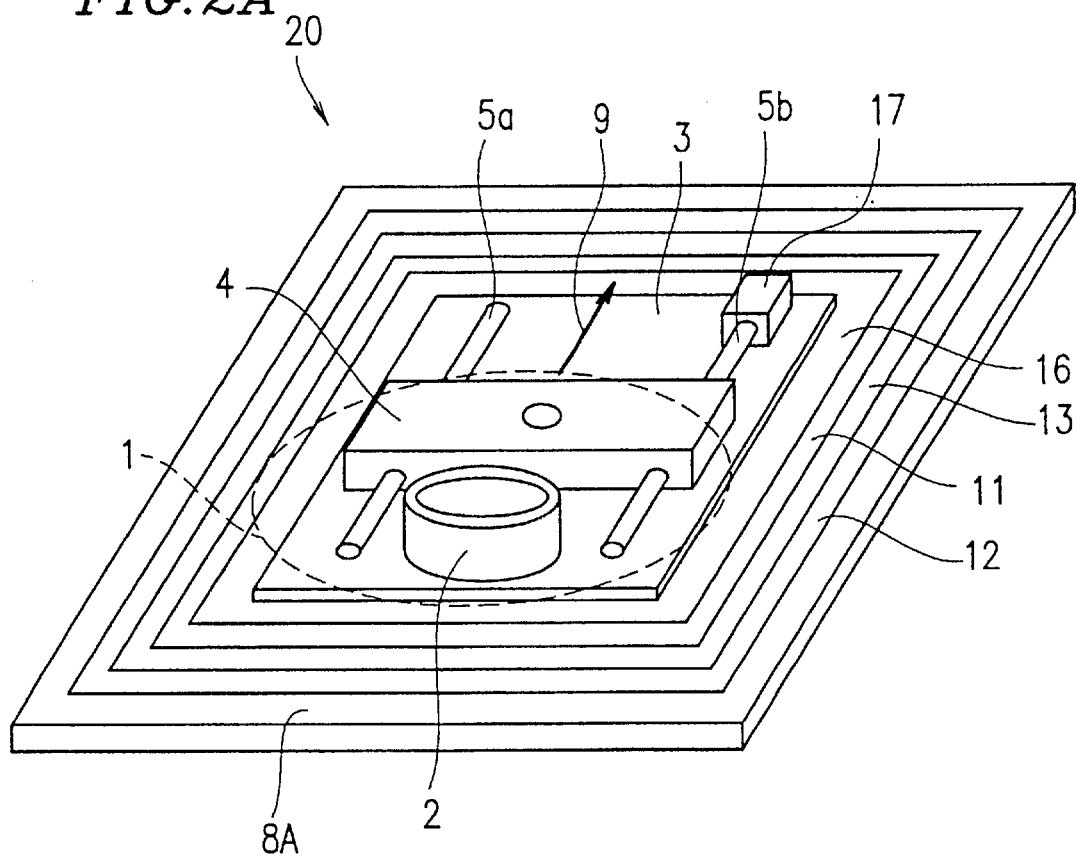
FIG. 2A in a perspective view of Embodiment 2 of a disk drive apparatus according to the present invention.
Figure 2B:
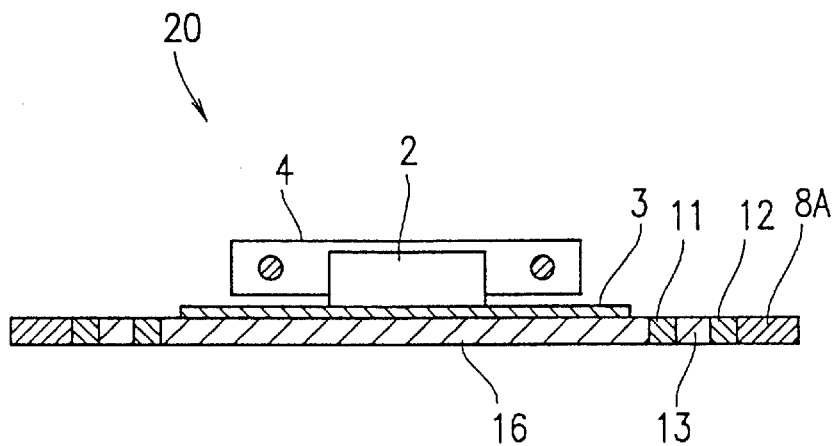
FIG. 2B is a cross-sectional view of the disk drive apparatus in FIG. 2A.

FIG. 2A is a perspective view of Embodiment 2 of a disk drive apparatus 20 according to the present invention. FIG. 2B is a cross-sectional view thereof.

The disk drive apparatus 20 in Embodiment 2 is different from that in Embodiment 1, in that a movable portion is composed of a first movable portion 16 and a second movable portion 13, and a damping portion is composed of a first damping portion 11 and a second damping portion 12. More specifically, the first damping portion 11 substantially in an annular shape is fixed around an outer periphery of the first movable portion 16 corresponding to the movable portion 6 in Embodiment 1, and the second movable portion 13 substantially in an annular shape is fixed around an outer periphery of the first damping portion 11. Furthermore, the second damping portion 12 substantially in an annular shape is fixed around an outer periphery of the second movable portion 13, and a chassis 8A is fixed around an outer periphery of the second damping portion 12.

The first movable portion 16, the first damping portion 11, the second movable portion 13, and the second damping portion 12. and the chassis 8A are integrally molded with resin and formed so as to be planar.

The basic damping function of Embodiment 2 of the disk drive apparatus is substantially the same as that in Embodiment 1 except for the following. In Embodiment 2, the mechanical vibrations generated inside the disk drive apparatus are attenuated by the combination of the first damping portion 11 and the second damping portion 12.

Furthermore, the shape of the first damping portion 11 is rendered different from that of the second damping portion 12 so as to obtain different intrinsic vibration frequencies. Thus, the mechanical vibrations can be attenuated by being dispersed to those with different frequencies. Furthermore, by rendering the shape of the first damping portion 11 different from that of the second damping portion 12, the disk drive apparatus can be made thinner.

Embodiment 3

FIG. 3 is a perspective view of Embodiment 3 of a disk drive apparatus 30 according to the present invention.

The disk drive apparatus 30 in Embodiment 3 is different from that in Embodiment 2 in that a bass 3A has only a recording/reproducing head 4, guide axes 5a and 5b, a movement drive portion 17, and a disk drive motor 2 is disposed on a second movable portion 13A.

Due to the above-mentioned structure in Embodiment 3, the mechanical vibrations of the disk drive motor 2 are generated in the second movable portion 13A, and the mechanical vibrations caused by the movement of the recording/reproducing head 4 are generated in the first movable portion 16A.

As described above, the mechanical vibrations are allowed to be generated separately in the first movable portion 16A and the second movable portion 13A, whereby the mechanical vibrations with respective frequencies can be attenuated by a first damping portion 11A and a second damping portion 12. Thus, the mechanical vibrations in the disk drive apparatus can be dispersed and efficiently attenuated by the combination of the first damping portion 11A and the second damping portion 12.

Embodiment 4

Figure 4:
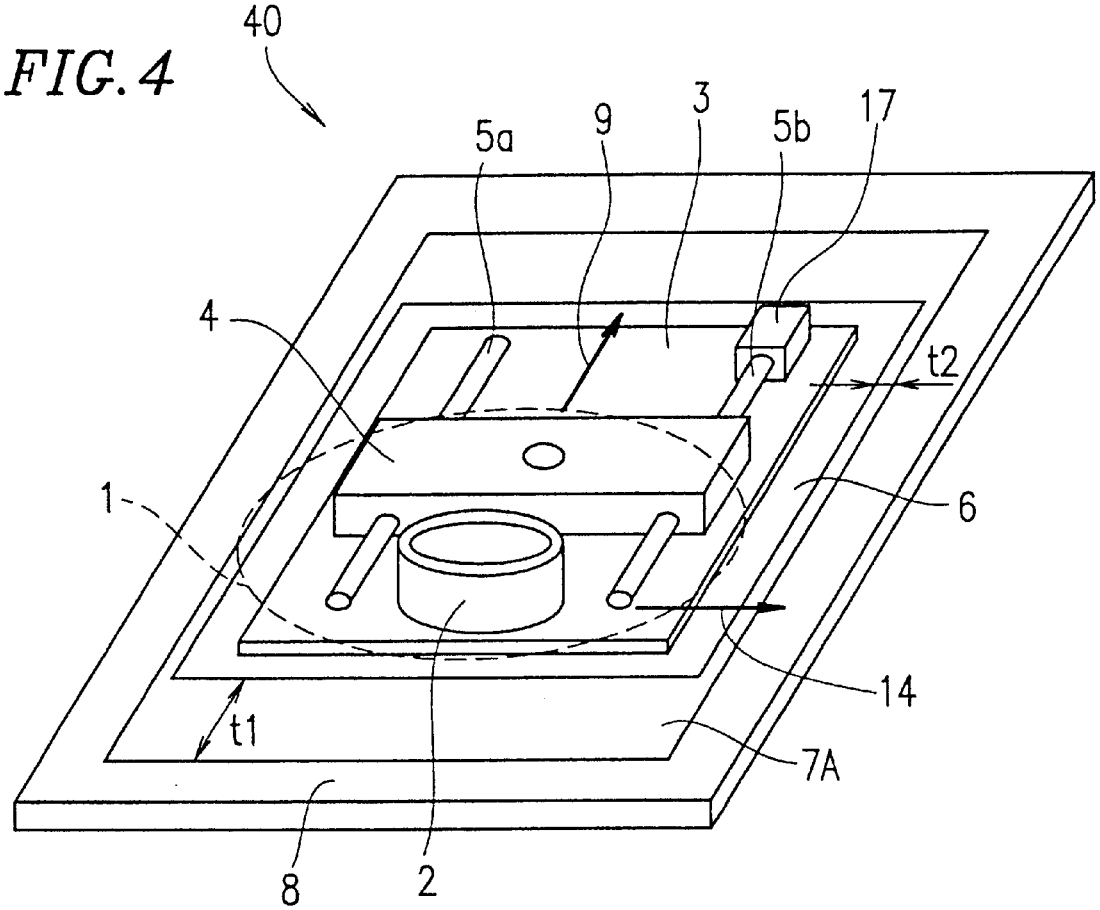
FIG. 4 is a perspective view of Embodiment 4 of a disk drive apparatus according to the present invention.

FIG. 4 is a perspective view of Embodiment 4 of a disk drive apparatus 40 according to the present invention.

The basic structure in Embodiment 4 is substantially the same as that in Embodiment 1 except that a cross-sectional shape (size and thickness) of a damping portion 7A substantially in an annular shape is rendered different between the respective directions. More specifically, a size t1 of the damping portion 7A in a radial direction 9 of a disk 1 is rendered different from a size t2 of the damping portion 7A in a tangential direction 14.

In Embodiment 4, the size t1 in the radial direction 9 of the disk 1 is prescribed to be longer than the size t2 (t1>t2) in the tangential direction 14. The basic damping function of such a damping mechanism is substantially the same an that in Embodiment 1 except for the following. In Embodiment 4, considering the directivity of the mechanical vibrations generated inside the disk drive apparatus, the intrinsic vibration frequency of the damping portion 7A in the radial direction 9 of the disk 1 and the intrinsic vibration frequency of the damping portion 7A in the tangential direction 14 can be controlled by adjusting the sizes t1 and t2 of the damping portion 7A.

In Embodiment 4, the longitudinal and transverse sizes of the damping portion 7A may be adjusted. However, the intrinsic vibration frequency in a thickness direction (focus direction) of the disk 1 may be controlled by adjusting the thickness of the damping portion 7A.

Figure 5A:
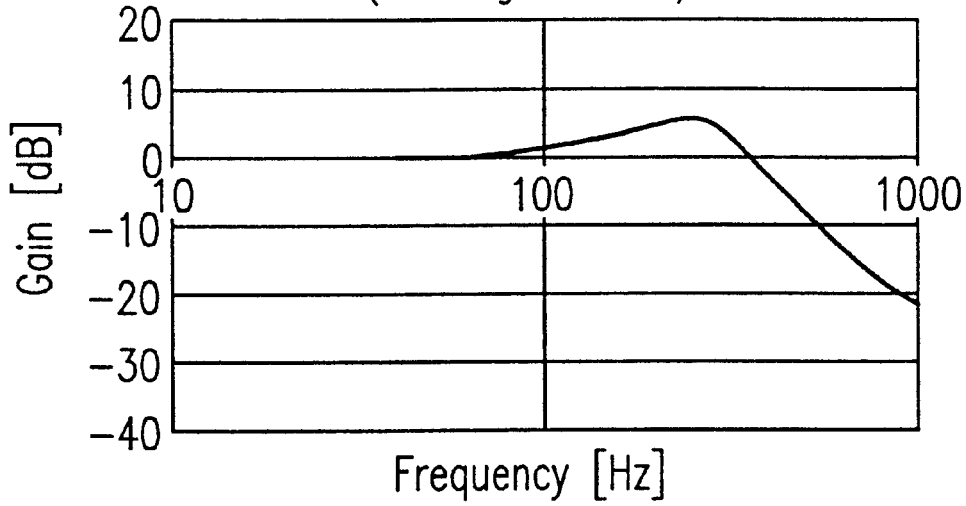
FIG. 5A is a graph showing intrinsic vibration frequency characteristics of a damping portion.
Figure 5B:
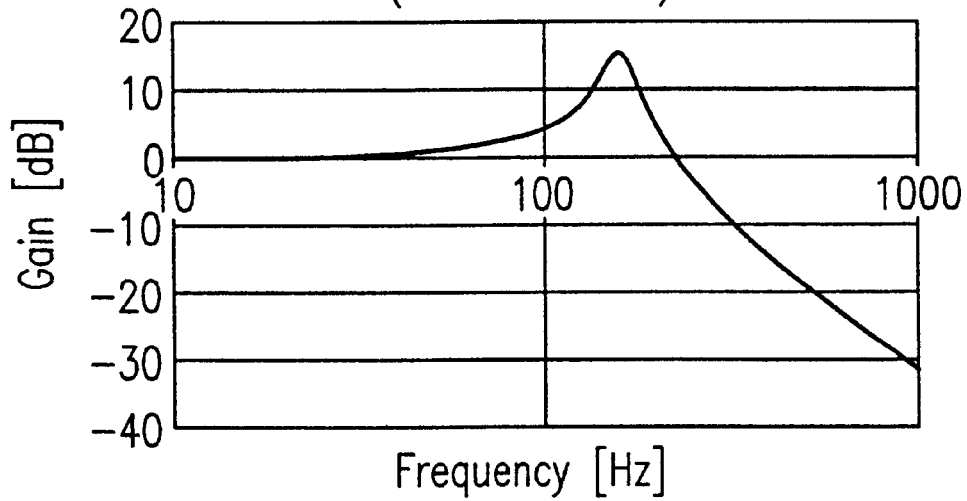
FIG. 5B is a graph showing other intrinsic vibration frequency characteristics of a damping portion.

FIGS. 5A and 5B are graphs showing intrinsic vibration frequency characteristics of the damping portion 7A. FIG. 5A shows the intrinsic vibration frequency characteristics of the damping portion 7A in the tangential direction (tracking direction) 14, and FIG. 5B shows the intrinsic vibration frequency characteristics of the damping portion 7A in the thickness direction (focus direction) of the disk 1. Mechanical vibration frequencies are different between the tracking direction and the focus direction. Therefore, if damping portions having the intrinsic vibration frequency characteristics in each direction are provided in accordance with the respective mechanical vibration frequencies, the mechanical vibrations can be effectively suppressed.

Embodiment 5

Figure 6:
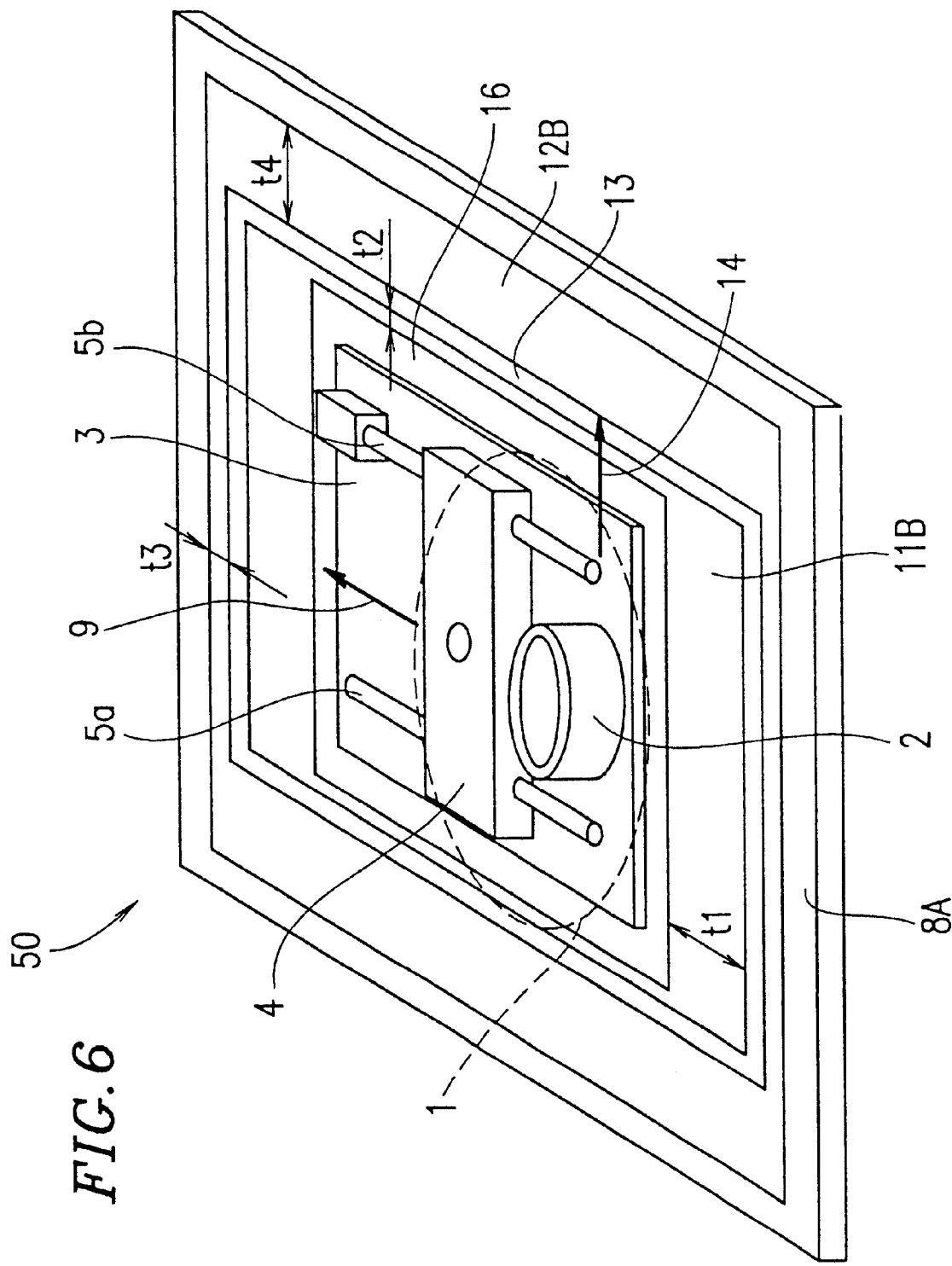
FIG. 6 is a perspective view of Embodiment 5 of a disk drive apparatus according to the present invention.

FIG. 6 is a perspective view of Embodiment 5 of a disk drive apparatus 50 according to the present invention.

The disk drive apparatus 50 in Embodiment 5 has substantially the same structure as that in Embodiment 2, except that each width of a first damping portion 11B and a second damping portion 12B both substantially in an annular shape are rendered different between the longitudinal direction and the transverse direction. More specifically, a size t1 of the first damping portion 11B in the radial direction 9 of a disk 1 is rendered different from a size t2 of the first damping portion 11B in a tangential direction 14 (t1>t2). Furthermore, a size t3 of the second damping portion 12B in the radial direction 9 of the disk 1 is rendered different from a size t4 of the second damping portion 12B in the tangential direction 14 (t4>t3).

The basic damping function of the disk drive apparatus 50 in Embodiment 5 is substantially the same as that in Embodiment 4 except for the following. In Embodiment 5, considering the directivity of the mechanical vibrations generated inside the disk drive apparatus 50, the intrinsic vibration frequency of the first damping portion 11B in the radial direction 9 of the disk 1 and the intrinsic vibration frequency of the first damping portion 11B in the tangential direction 14 can be controlled by adjusting the sizes t1 and t2 of the first damping portion 11B. In addition, considering the directivity of the mechanical vibrations applied to a chassis 8A as external disturbance vibrations from outside the disk drive apparatus 50, the intrinsic vibration frequency of the second damping portion 12B in the radial direction 9 of the disk 1 and the intrinsic vibration frequency of the second damping portion 12B in the tangential direction 14 can be controlled by adjusting the sizes t3 and t4 of the second damping portion 12B.

More specifically, due to the above-mentioned structure in Embodiment 5, the propagation of the mechanical vibrations with bi-directivity (i.e., internal vibrations and external disturbance vibrations) in the disk drive apparatus 50 can be efficiently attenuated.

Embodiment 6

Figure 7:
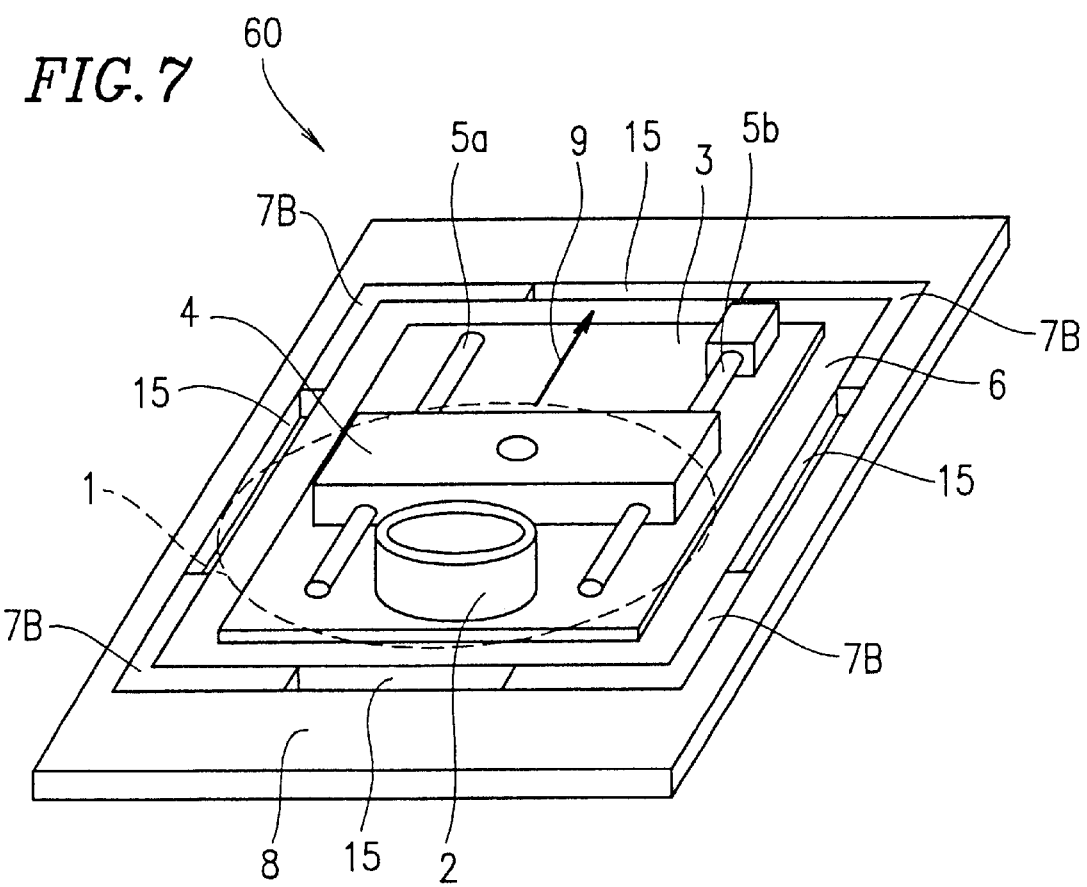
FIG. 7 is a perspective view of Embodiment 6 of a disk drive apparatus according to the present invention.

FIG. 7 is a perspective view of Embodiment 6 of a disk drive apparatus 60 according to the present invention.

The basic structure in Embodiment 7 is substantially the same as that in Embodiment 1, except that a part of a damping portion 7B substantially in an annular shape is omitted to provide gaps 15.

The basic damping function of the disk drive apparatus 60 in Embodiment 6 is substantially the same as that in Embodiment 1, except that a design flexibility for setting the intrinsic vibration frequency of the damping portion 7B is remarkably enlarged. In Embodiment 6, each part of four sizes of the damping portion 7B is omitted, which is effective for setting the intrinsic vibration frequency of the damping portion 7B particularly at about 100 Hz or less.

Embodiment 7

Figure 8A:
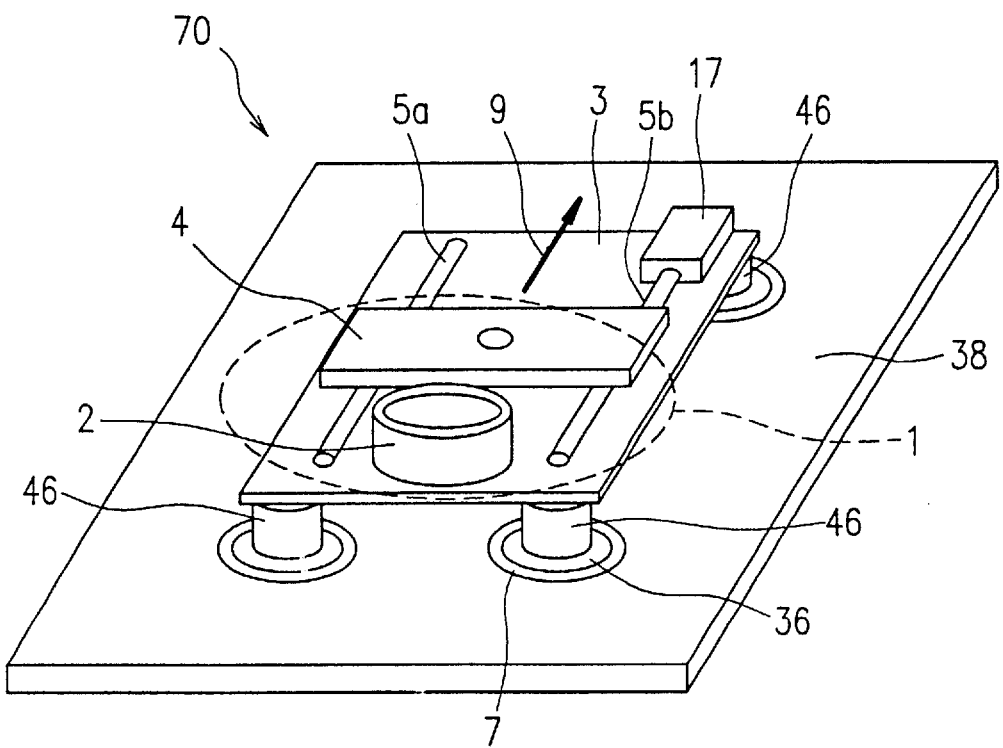
FIG. 8A is a perspective view of Embodiment 7 of an entire disk drive apparatus after assembly according to the present invention.
Figure 8B:
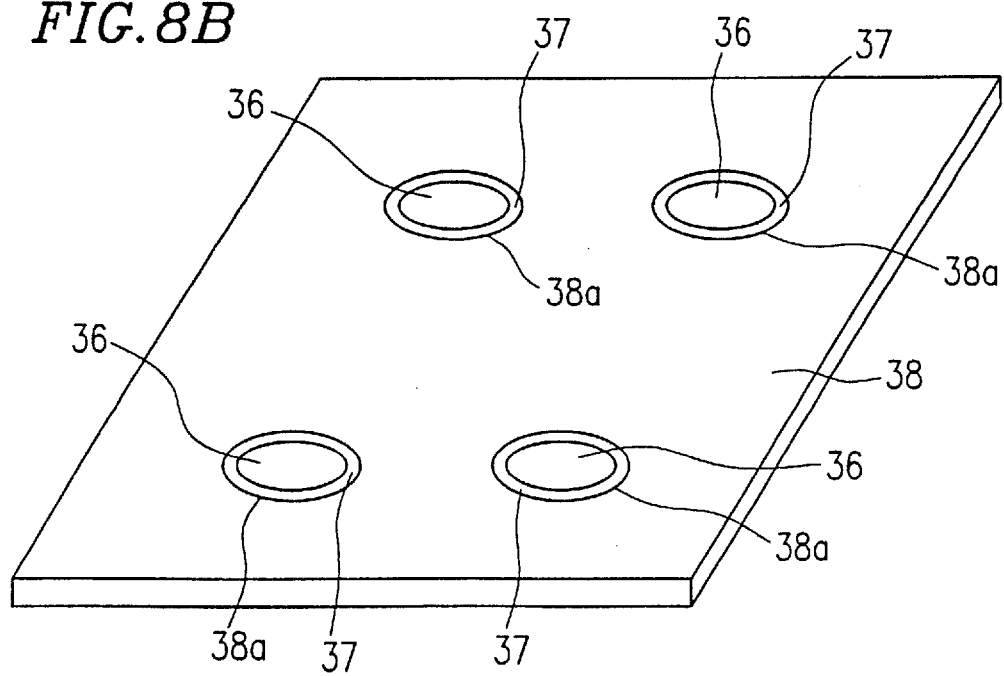
FIG. 8B is a perspective view of a chassis in the disk drive apparatus in FIG. 8A.

FIGS. 8A and 8B are perspective views of Embodiment 7 of a disk drive apparatus 70 according to the present invention. FIG. 8A is a perspective view of the entire disk drive apparatus 70 after assembly, and FIG. 8B is a perspective view of a chassis.

The basic structure of a base 3 in Embodiment 7 is substantially the same as that in Embodiment 1, except that a plurality of stationary cylinders 46 are provided on the base 3 (in Embodiment 7, each corner of the base 3 has a stationary cylinder 46), and a damping mechanism is provided to each stationary cylinder 46. More specifically, each stationary cylinder 46 is fixed on a disk-shaped movable portion 36, and a damping portion 37 substantially in an annular shape is fixed around an outer periphery of each movable portion 36. Furthermore, the outer periphery of each damping portion 37 is fixed into each stationary hole 38a provided in a chassis 38.

The basic damping function of the disk drive apparatus 70 in Embodiment 7 is substantially the same as that in Embodiment 1, except that a planar available space of the damping portions 37 in the disk drive apparatus 70 is limited, which is effective in the case where the curvature of the damping portion 37 substantially in an annular shape cannot be increased.

Furthermore, a plurality of damping portions 37 substantially in an annular shape may be provided with different diameters and thicknesses, whereby the intrinsic vibration frequency of each damping portion 37 can be arbitrarily set. As a result, even when the center of gravity of the base 3 is biased toward the disk drive motor 2, a space accommodating vibrations of the base 3 maintained in a horizontal posture can be equally disposed and minimized, which is suitable for rendering the disk drive apparatus 70 thinner.

Embodiment 8

Figure 9A:
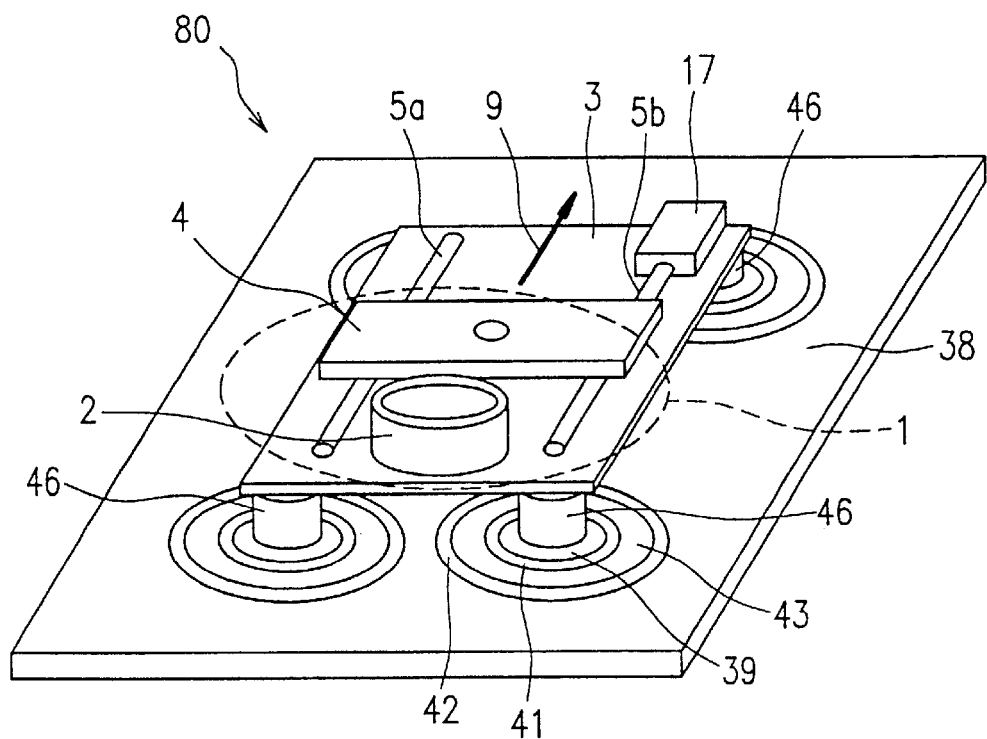
FIG. 9A is a perspective view of Embodiment 8 of an entire disk drive apparatus after assembly according to the present invention.
Figure 9B:
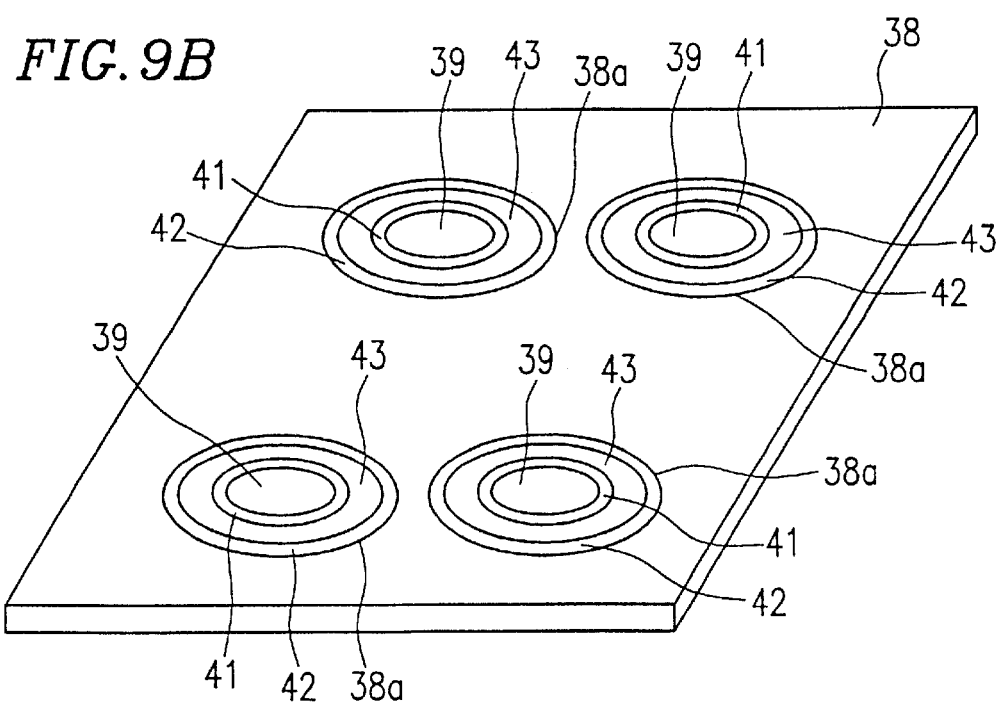
FIG. 9B is a perspective view of a chassis in the disk drive apparatus in FIG. 9A.

FIGS. 9A and 9B are perspective views of Embodiment 8 of a disk drive apparatus 80 according to the present invention. FIG. 9A is a perspective view showing the entire disk drive apparatus 80 after assembly, and FIG. 9B is a perspective view of a chassis.

The basic structure of the disk drive apparatus 80 in Embodiment 8 is substantially the same as that in Embodiment 7, except that a damping portion includes a first damping portion 41 and a second damping portion 42. More specifically, a stationary cylinder 46 is fixed on each first movable portion 39 in a disk shape, and a first damping portion 41, a second movable portion 43, and a second damping portion 42 are successively provided around an outer periphery of the first movable portion 39. The outer periphery of the second damping portion 42 is fixed into each stationary hole 38a provided in a chassis 38.

The basic damping function of the disk drive apparatus 80 in Embodiment 8 is substantially the same as that in Embodiment 7 except for the following. In embodiment 8, the shapes of the first damping portion 41 and the second damping portion 42 are rendered different for each stationary cylinder 46 so as to obtain different intrinsic vibration frequencies, whereby the internal vibrations in the disk drive apparatus 80 can be attenuated by being dispersed in frequency regions.

Embodiment 9

Figure 10:
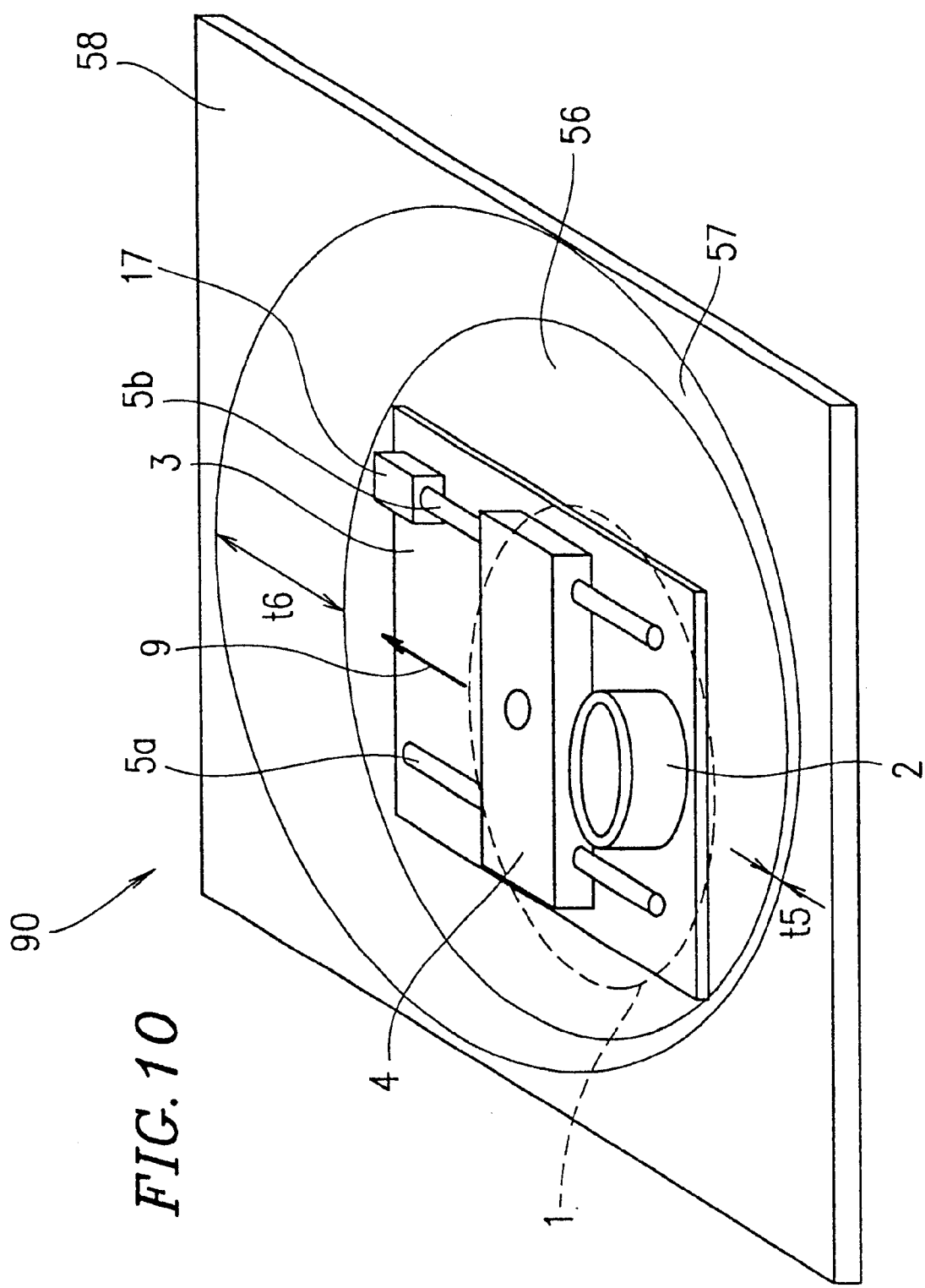
FIG. 10 is a perspective view of Embodiment 9 of a disk drive apparatus according to the present invention.

FIG. 10 is a perspective view of Embodiment 9 of a disk drive apparatus 90 according to the present invention.

The basic structure of the disk drive apparatus 90 in Embodiment 9 is substantially the same as those in Embodiments 1 and 4, except that sizes t5 and t6 of a damping portion 57 substantially in an annular shape provided around an outer periphery of a disk-shaped movable portion 56 are partially rendered different. More specifically, the size t5 of the damping portion 57 on a disk drive motor 2 side is rendered different from the size t6 on a recording/reproducing head 4 (t6>t5) in a radial direction 9 of a disk 1.

The basic damping function of the damping mechanism in Embodiment 9 in substantially the same as that in Embodiment 7. As a result, even when the center of gravity of the base 3 is biased toward the disk drive motor 2, a space accommodating vibrations of the base 3 maintained in a horizontal posture can be equally disposed and minimized.

Embodiment 10

Figure 11:
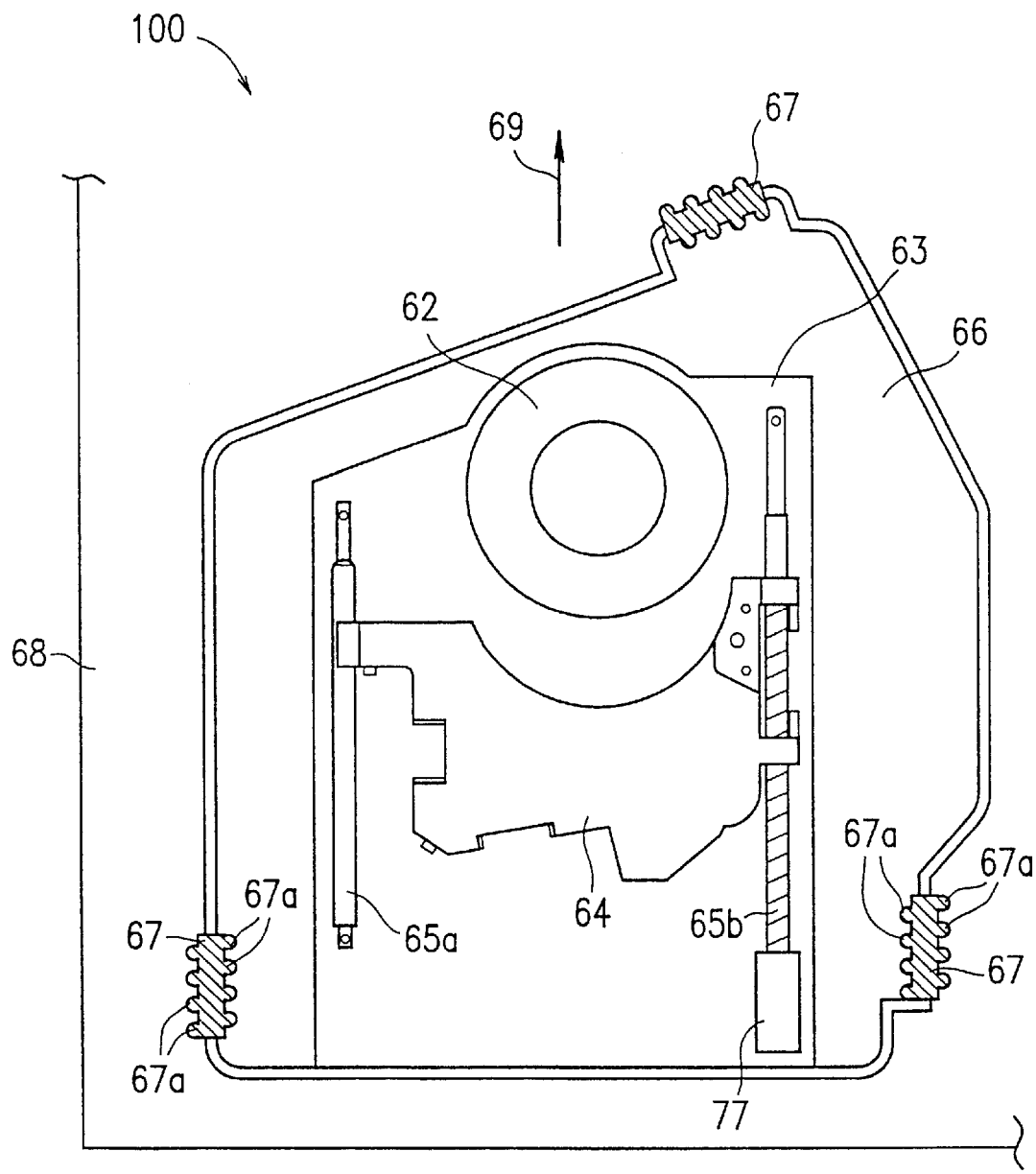
FIG. 11 is a plan view of Embodiment 10 of a disk drive apparatus according to the present invention.

FIG. 11 is a plan view of Embodiment 10 of a disk drive apparatus 100 according to the present invention.

As shown in FIG. 11, a disk drive motor 62 in fixed onto a base 63, and two guide axes 65a and 65b are fixed onto the base 63. A recording/reproducing head 64 is supported by the guide axes 65a and 65b so as to move in a radial direction 69 of a disk. The guide axis 65b is a screw with which the recording/reproducing head 64 is engaged. The recording/reproducing head 64 is moved by allowing the guide axis 65b to pivot by a movement drive portion 77.

The bottom of the bass 63 is fixed onto a movable portion 66 having a plate shape in plane, made of synthetic resin such as ABS resin and PBT resin. An annular chassis 68 having a rectangular shape in plane, made of synthetic resin is fixed outside the movable portion 66. An annular gap is formed between the movable portion 66 and the chassis 68, and three damping portions 67 made of resin are disposed in the gap. Each damping portion 67 has a plurality of branch portions 67a on both sides thereof. The branch portions 67a of each damping portion 67 enter the movable portion 66 and the chassis 68, whereby the movable portion 66 is connected to the chassis 68.

The movable portion 66 and the damping portion 67 may be integrated with mold, and at least a part of the inner and outer peripheries thereof should be fixed to each other.

Due to the above-mentioned structure, the recording/reproducing head 64 for recording or reproducing information with respect to the disk which is rotated at a high speed is moved in the radial direction 69 of the disk at a high speed by the movement drive portion 77, thereby recording/reproducing information with respect to the disk at a high speed. At this time, the high-speed rotation of the disk and the high-speed movement of the recording/reproducing head 64 in the radial direction 69 of the disk cause mechanical vibrations.

Thus, in order to minimize the propagation of the above-mentioned mechanical vibrations generated inside the apparatus to outside the apparatus, the mechanical vibrations are attenuated by the damping portion 67. Furthermore, in order to minimize the propagation of the mechanical vibrations of the chassis 68 caused by shock and vibrations outside the apparatus to inside the apparatus, the mechanical vibrations are attenuated by the damping portion 67.

The damping function in Embodiment 10 is substantially the same as that in a conventional damping mechanism. However, the damping portion 67, the movable portion 66, and the chassis 68 are integrated so as to be planar; therefore, the disk drive apparatus can be rendered thinner, and a design flexibility of the damping portion 67 can be increased.

Figure 12:
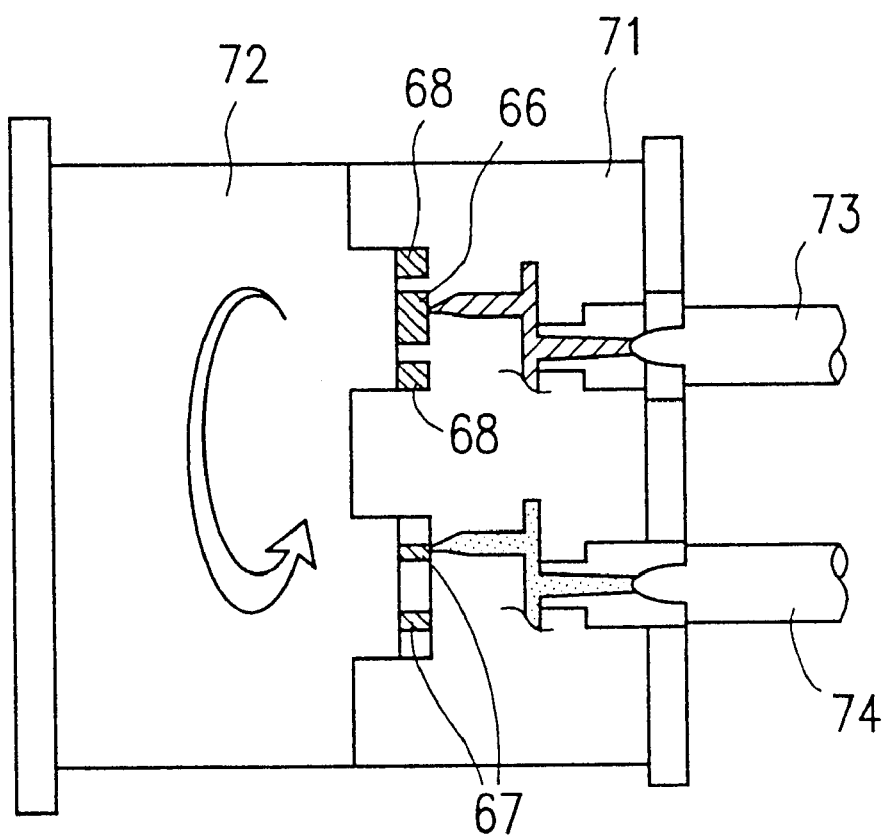
FIG. 12 illustrates the steps of producing a stationary portion, a damping portion, and a movable portion in the disk drive apparatus in FIG. 11.

FIG. 12 shows a method for producing the stationary portion, the damping portion, and the movable portion in the apparatus shown in FIG. 11.

The method shown in FIG. 12 is a molding method called a core rotation system using a first mold 71 and a second mold 72. In the first step, the first mold 71 is combined with the second mold 72, whereby a space for molding the movable portion 66 and the chassis 68 is formed in the first mold 71 and the second mold 72. In this state, molten synthetic resin is injected into the first mold 71 and the second mold 72 through a first nozzle 73, whereby the movable portion 66 and the chassis 68 are molded.

Thereafter, the second mold 72 is moved in the left direction to remove the second mold 72 from the first mold 71. Furthermore, after the second mold 72 is rotated by 180°, the second mold 72 is moved in the right direction, whereby the first mold 71 is combined with the second mold 72. Thus, a space for molding the damping portion 67 is formed in the first mold 71 and the second mold 72. In this state, molten synthetic resin is injected into the first mold 71 and the second mold 72 through a second nozzle 74, whereby the damping portion 67 is molded.

Finally, the second mold 72 is removed from the first mold 71, and the integrated molding of the movable portion 66, the chassis 68, and the damping portion 67 are taken out.

Embodiment 11

Figure 13:
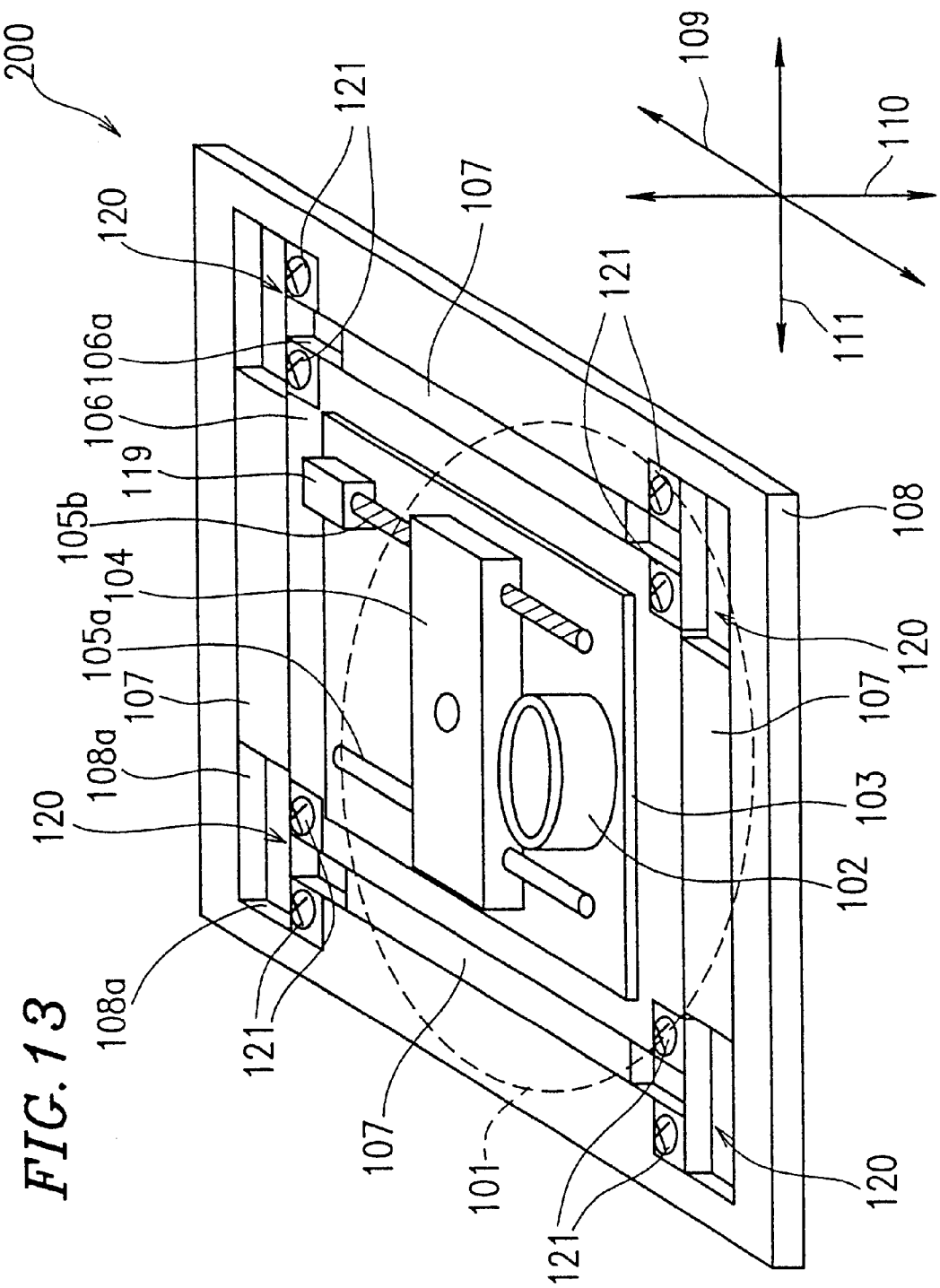
FIG. 13 is a perspective view of Embodiment 11 of a disk drive apparatus according to the present invention.

FIG. 13 is a perspective view of Embodiment 11 of a disk drive apparatus 200 according to the present invention.

As shown in FIG. 13, a disk drive motor 102 is fixed onto a base 103. A recording/reproducing head 104 is supported by two guide axes 105a and 105b fixed on the base 103 so as to move in a head movement direction 109.

The guide axis 105b is provided with a screw, for example, with which the recording/reproducing head 104 is engaged, and a movement drive portion 119 is disposed at an end portion of the guide axis 105b. The bottom or side of the base 103 is fixed to a movable portion 106 having a plate shape in plans, made of synthetic resin such as ABS resin and PBT resin.

The movable portion 106 is attached to a chassis 108 via a connecting portion 120 of a flat spring made of metal such as phosphor bronze. In order to prescribe the intrinsic vibration frequency of the connecting portion 120 in the head movement direction 109 to be lower than the intrinsic vibration frequency of the connecting portion 120 in a tangential direction 111 orthogonal to the head movement direction 109 and a disk thickness direction 110, and to be lower than the intrinsic vibration frequency of the connecting portion 120 in the disk thickness direction 110, the connecting portion 120 is attached to the movable portion 106 and the chassis 108 so as to bend in the head movement direction 109. The connecting portion 120 is fixed to the movable portion 106 and the chassis 108 by fastening portions 121 such as screws.

A damping portion 107 in a plate shape, made of thermosetting resin such as rubber resin or thermoplastic resin such as elastomer resin is fixed to each outer side surface 106a of the movable portion 106.

Each outer side of the damping portion 107 is fixed to a side surface 108a of the annular chassis 108 having a rectangular shape in plane, made of synthetic resin. The chassis 108 is fixed to a body (not shown) of the disk drive apparatus 200. The movable portion 106 becomes movable with respect to the chassis 108 via the damping portion 107 and the connecting portion 120.

The movable portion 106, the damping portion 107, and the chassis 108 are integrally molded by the same production steps as those in FIG. 12. At least a part of the inner and outer peripheries of the movable portion 106, the damping portion 107, and the chassis 108 should be connected to each other.

The case where the movable portion 106, the damping portion 107, and the chassis 108 are integrally molded with resin has been described. However, the present invention is not limited thereto. The movable portion 106, the damping portion 107, and the chassis 108 may be mechanically engaged with each other, or may be bonded to each other with an adhesive. A fixing method should be appropriately selected in accordance with the material of each portion. Furthermore, the movable portion 106 may be formed of a part of the base 103 and the movable portion 106.

The damping function of the disk drive apparatus 200 in Embodiment 11 thus constructed will be described.

A recording/reproducing head 104 for recording/reproducing information with respect to a disk 101 which is rotated at a high speed is moved at a high speed in a head movement direction 109 by the movement drive portion 119, thereby recording or reproducing information with respect to the disk 101.

At this time, the high-speed rotation of the disk 101 and the high-speed movement of the recording/reproducing head 104 in the head movement direction 109 cause mechanical vibrations. The connecting portion 120 is attached to the movable portion 106 and the chassis 108 so as to band in the head movement direction 109. Therefore, the movable portion 106 is vibrated in the head movement direction 109 by the generated mechanical vibrations. In order to minimize the propagation of the mechanical vibrations generated inside the apparatus to outside the apparatus, the mechanical vibrations are attenuated by the damping portion 107.

According to the damping function, the above-mentioned damping effect in obtained. In addition, since the stiffness of the damping mechanism in the disk thickness direction 110 is enhanced by the connecting portion 120, the movable portion 106 becomes unlikely to sink due to its weight. Therefore, the available space for the damping mechanism can be decreased.

The movable portion 106 is attached to the chassis 108 via the connecting portion 120. Therefore, the movable portion 106 will not bump into the chassis 108 to be damaged due to shock in the limited available space.

Furthermore, even at a time of shock or load, the amount of movement in the movable portion 106 in suppressed by the connecting portion 120, so that the damping portion 107 is not detached from the movable portion 106 or the chassis 108, whereby high endurance can be kept.

In Embodiment 11, the case where the connecting portion 120 of a flat spring made of metal has been described. However, the present invention in not limited thereto. Even when the connecting portion 120 is a flat spring made of plastic, the same effect can be obtained.

Furthermore, in Embodiment 11, the case where the fastening portion 121 is used for fastening the connecting portion 120 has been described. However, the present invention is not limited thereto. The connecting portion 120, the movable portion 106, and the chassis 108 may be integrated with resin. In this case, a small number of components suffices, resulting in a low production cost.

Embodiment 12

Figure 14:
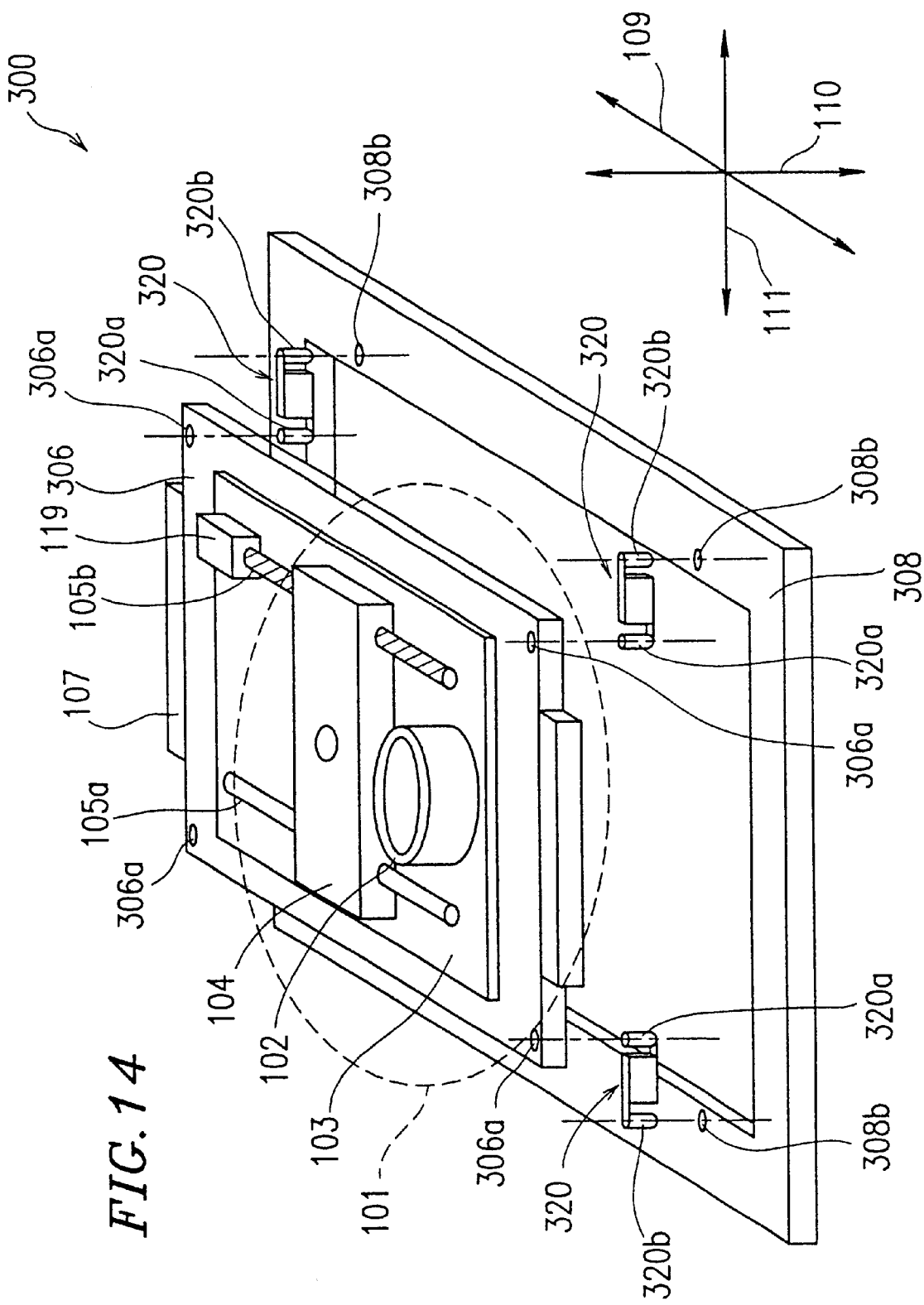
FIG. 14 is a perspective view of Embodiment 12 of a disk drive apparatus according to the present invention.

FIG. 14 is a perspective view of Embodiment 12 of a disk drive apparatus 300 according to the present invention.

The structure of the disk drive apparatus 300 in Embodiment 12 is different from that in Embodiment 11, in that a pivot portion is provided at a part of each connecting portion 320, which pivots with respect to a movable portion 306 and a stationary portion 308. The connecting portion 320 has pivot axes 320a and 320b having axes substantially in the same direction as a disk thickness direction 110. The pivot axis 320a is pivotally supported in a pivot hole 306a provided in the movable portion 306, and the pivot axis 320b is pivotally supported in a pivot hole 308b provided in the chassis 308.

The basic operation of the above-mentioned damping mechanism is substantially the same as that in Embodiment 11 except for the following. In Embodiment 12, a movement load of the movable portion 306 in a head movement direction 109 is reduced by the connecting portion 320 so that the movable portion 306 becomes likely to vibrate in the head movement direction 109. Since the movable portion 306 becomes likely to vibrate in the head movement direction 109, the mechanical vibrations inside the disk drive apparatus 300 can be efficiently attenuated by a damping portion 107 via the movable portion 306.

In Embodiment 12, the connecting portion 320 has pivot axes. Even when the connecting portion 320 is provided with pivot holes, and pivot axes are provided in the movable portion 306 and the chassis 308, the same effect can be obtained.

Embodiment 13

Figure 15:
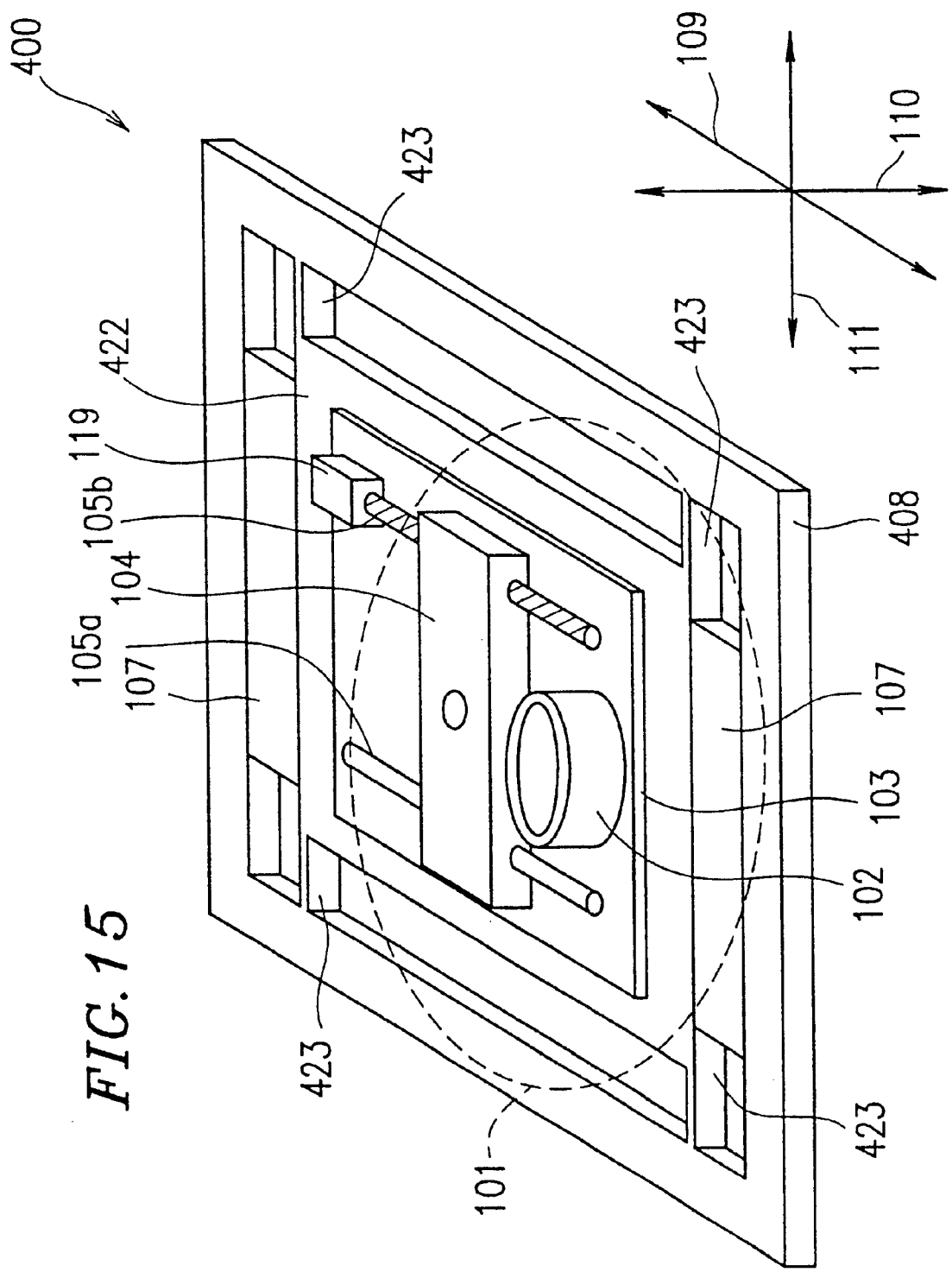
FIG. 15 is a perspective view of Embodiment 13 of a disk drive apparatus according to the present invention.

FIG. 15 in a perspective view of Embodiment 13 of a disk drive apparatus 400 according to the present invention.

The disk drive apparatus 400 in Embodiment 13 is different from that in Embodiment 11 in that a chassis 408 is integrated with a movable portion 422 and a connecting portion 423. Due to this structure, the connecting portion 423 bends in a direction represented by an arrow 109 as a flat spring made of resin. Therefore, the movable portion 422 vibrates in a head movement direction 109 due to mechanical vibrations generated by the high-speed rotation of a disk 101 and the high-speed movement of a recording/reproducing head 104. The vibrations of the movable portion 422 in the head movement direction 109 are attenuated by a damping portion 107. Therefore, in addition to the effect of Embodiment 11, the number of components can be largely reduced. Needless to say, this is suitable for rendering the disk drive apparatus 400 thinner.

Embodiment 14

Figure 16B:
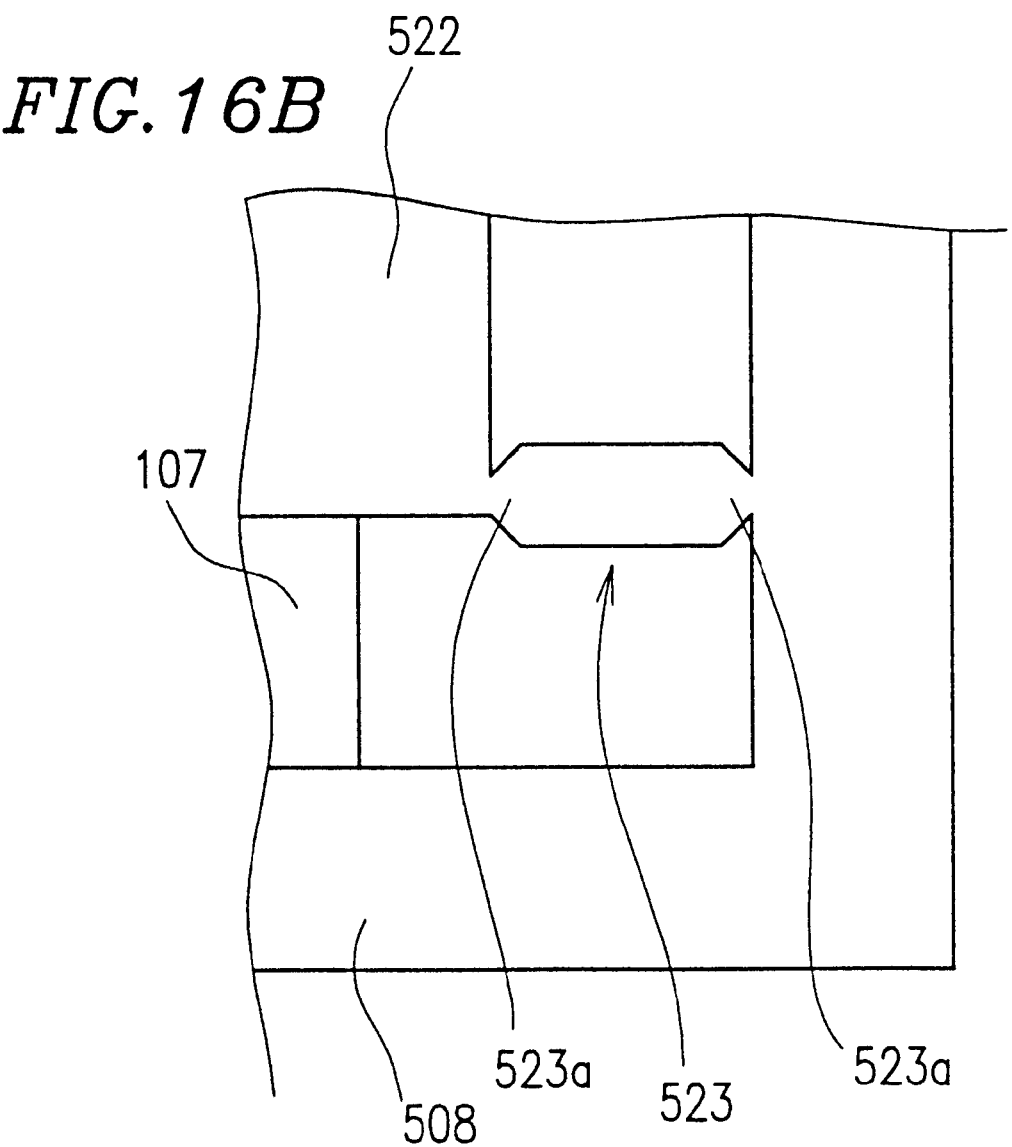
FIG. 16B in a plan view showing main portions of the disk drive apparatus in FIG. 16A.

FIG. 16A is a perspective view of Embodiment 14 of a disk drive apparatus 500 according to the present invention. FIG. 16B is a plan view showing main portions of the disk drive apparatus 500 in Embodiment 14.

The structure of the disk drive apparatus 500 in Embodiment 14 is different from that in Embodiment 13 in that both ends of a connecting portion 523 are provided with hinge portions 523a. More specifically, the thickness of the connecting portion 523 is rendered thinner at its ends.

The basic operation of the disk drive apparatus 500 is substantially the same as that in Embodiment 3 except for the following. In Embodiment 14, since a movement load of a movable portion 522 in a head movement direction 109 is small, the movable portion 522 largely vibrates in the head movement direction 109, which allows a damping portion 107 to have a larger effect of attenuating vibrations.

Figure 17:
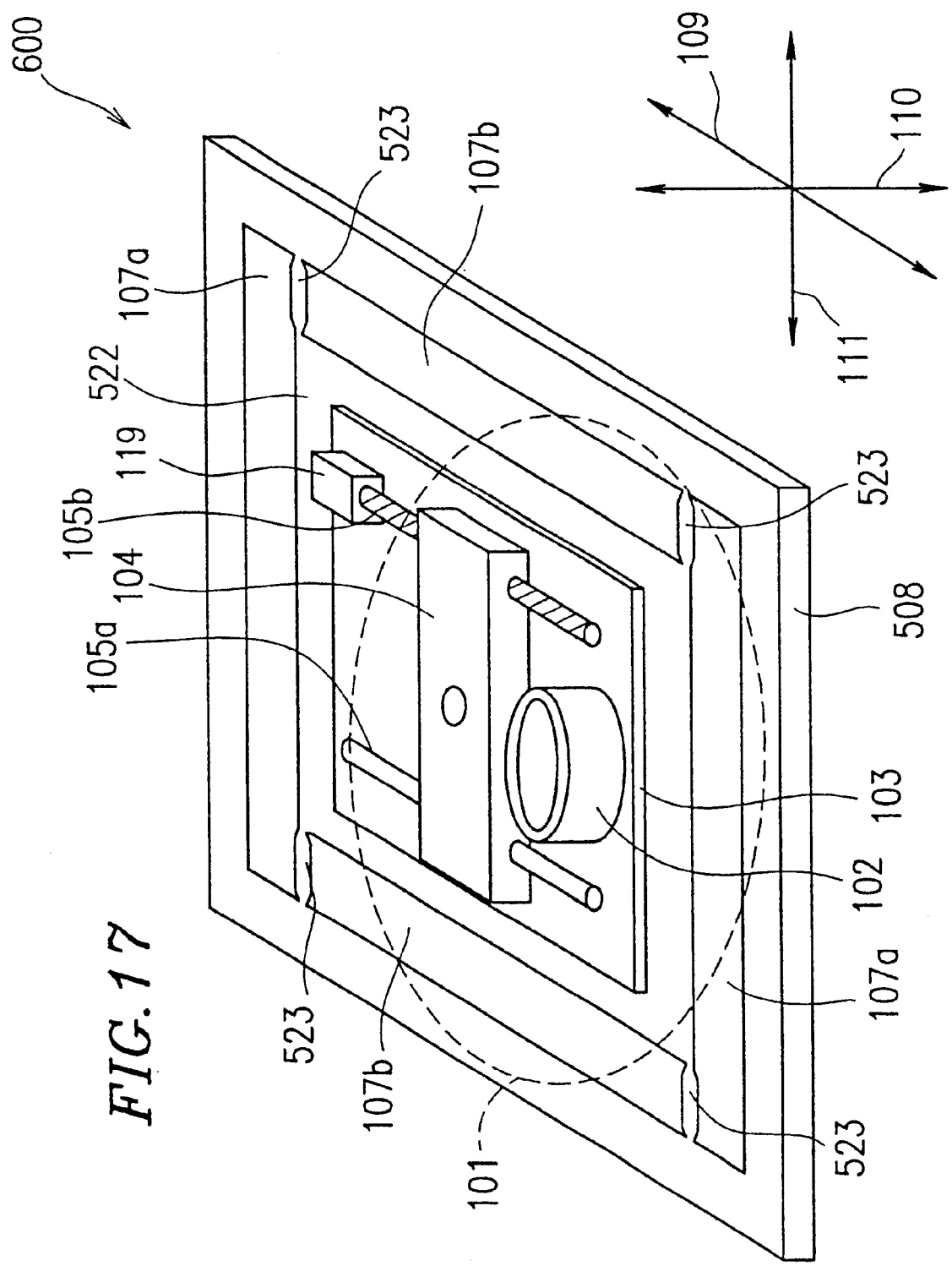
FIG. 17 is a perspective view showing a modified example of the disk drive apparatus in FIG. 16A.

In Embodiment 14, the damping portions 107 are provided at parts of the movable portion 522 and the chassis 508. However, as in a disk drive apparatus 600 shown in FIG. 17, damping portions 107a and 107b may be provided in the entire surfaces where the movable portion 522 are opposed to the chassis 508. In this case, an opening is blocked in a disk thickness direction 110, which prevents dust and dirt from passing therethrough. Thus, it is possible to perform a dust-proofing design. More specifically, a disk drive apparatus can be provided, which is stably operated even in a bad environment exposed to a lot of dust and dirt.

Embodiment 15

Figure 18:
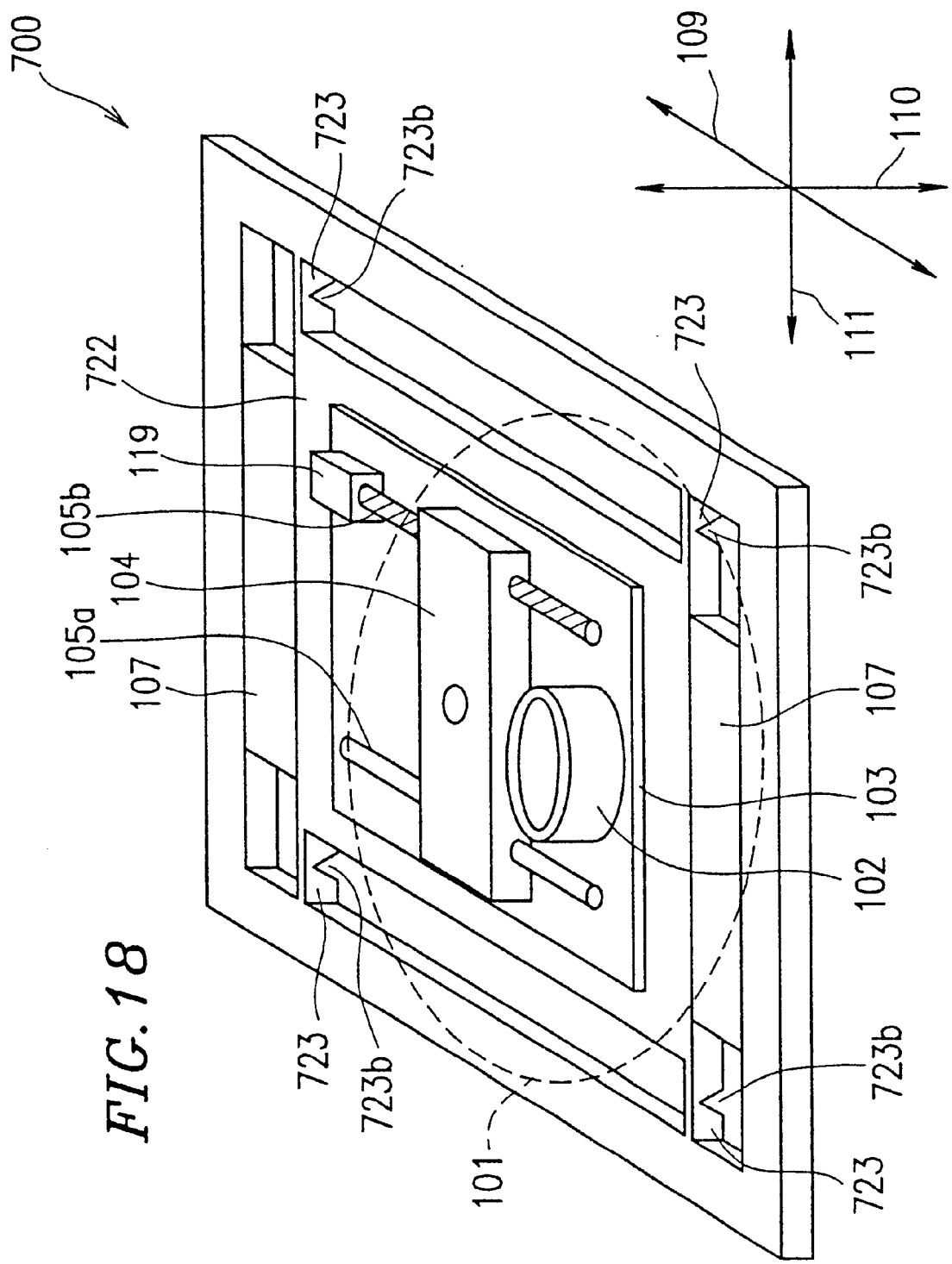
FIG. 18 is a perspective view of Embodiment 15 of a disk drive apparatus according to the present invention.

FIG. 18 is a perspective view of Embodiment 15 of a disk drive apparatus 700 according to the present invention.

The basic structure of the disk drive apparatus 700 in Embodiment 15 is substantially the same as that in Embodiment 13 except that a cut-away portion 723b is provided in each connecting portion 723. More specifically, the cut-away portion 723b is provided in such a manner that the thickness of the connecting portion 723 in a disk thickness direction 109 becomes partially thinner.

The basic operation of the disk drive apparatus 700 is substantially the same as that in Embodiment 13 except for the following. In Embodiment 15, due to the cut-away portion 723b, a movable portion 722 can vibrate in a disk thickness direction 110, and the mechanical vibrations generated in the disk thickness direction 110 can be attenuated by damping portions 107.

Because of the above-mentioned structure, the directivity of the intrinsic vibration frequency of the movable portion 722 is rendered different, whereby the mechanical vibrations can be attenuated by being dispersed in frequency regions.

Embodiment 16

Figure 19:
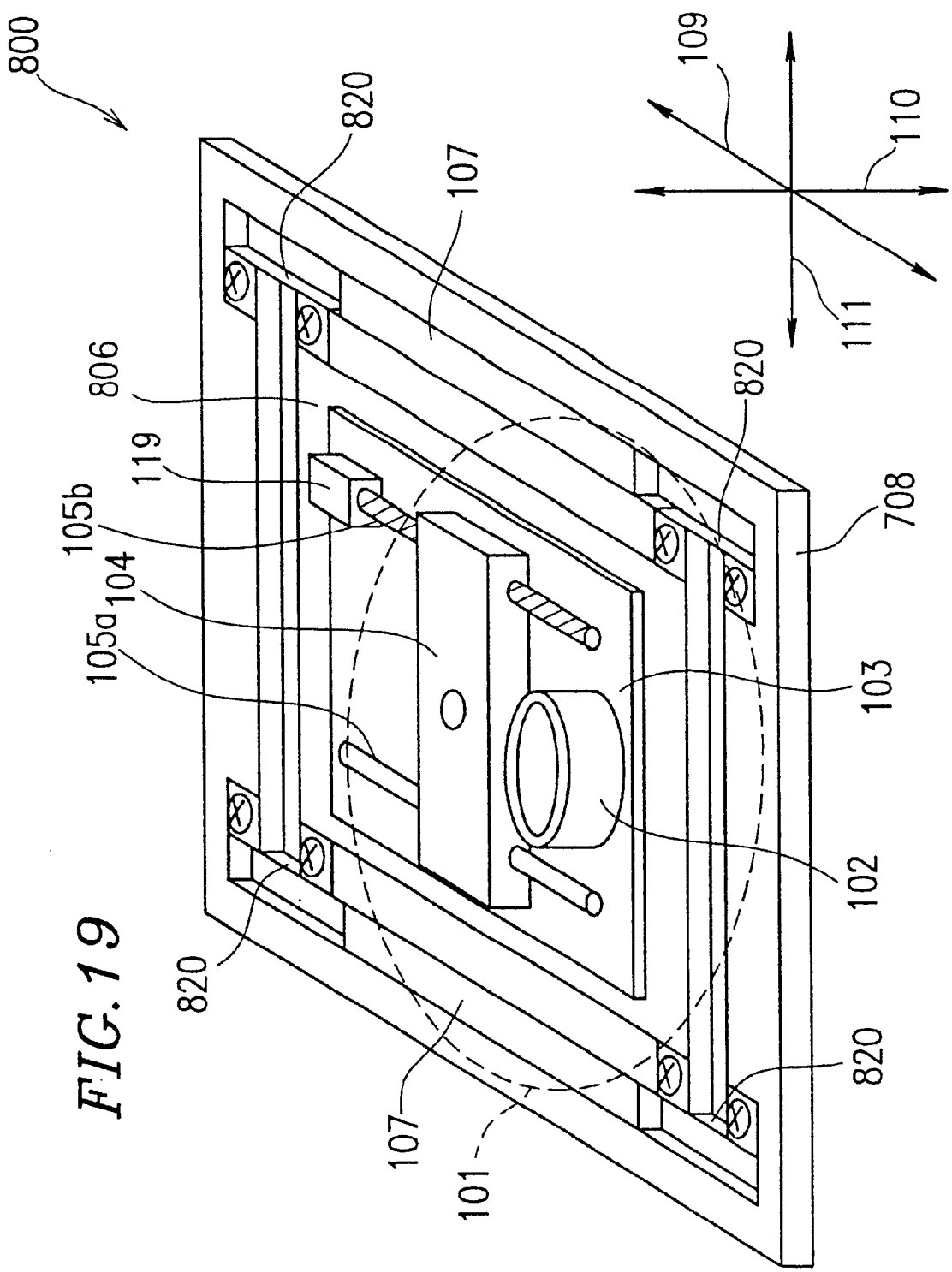
FIG. 19 is a perspective view of Embodiment 16 of a disk drive apparatus according to the present invention.

FIG. 19 is a perspective view of Embodiment 16 of a disk drive apparatus 800 according to the present invention.

The basic structure of the disk drive apparatus 800 in Embodiment 16 is substantially the same as that in Embodiment 11 except for the following. In Embodiment 16, the intrinsic vibration frequency in a tangential direction 111 among the intrinsic vibration frequency of a connecting portion 820 is prescribed to be lower than those in a head movement direction 109 and a disk thickness direction 110. More specifically, the thickness of the connecting portion 820 in the tangential direction 111 is designed so as to be smaller. The connecting portion 820 functions so as to bend in the tangential direction 111 as a flat spring.

The basic operation of the disk drive apparatus 800 is substantially the same as that in Embodiment 11, except that the connecting portion 820 largely vibrates in the tangential direction 111. This is because the connecting portion 820 functions so as to bend in the tangential direction 111.

The above-mentioned structure is particularly effective in the case where the bias of the center of gravity of a disk 101 is large. The vibrations generated by the rotation of a disk 101 are directed in the tangential direction 111 so as to be orthogonal to the movement direction (represented by an arrow 109) of a recording/reproducing head 104. Thus, the vibrations by the rotation of the disk 101 are prevented from being overlapped with the vibrations by the high-speed movement of the recording/reproducing head 104, whereby a stable recording or reproducing operation may be realized.

Embodiment 17

Figure 20:
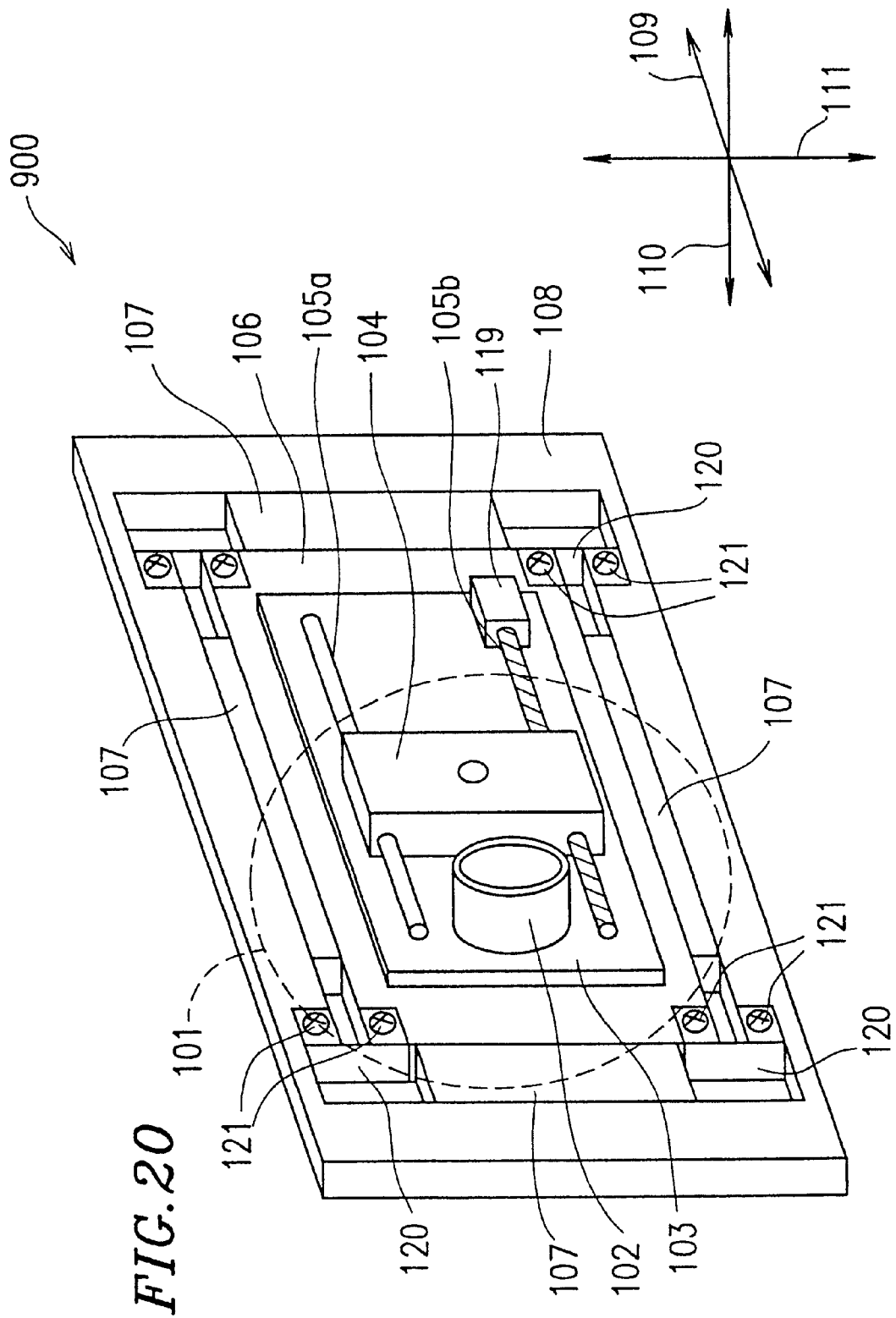
FIG. 20 is a perspective view of Embodiment 17 of a disk drive apparatus according to the present invention.
Figure 21:
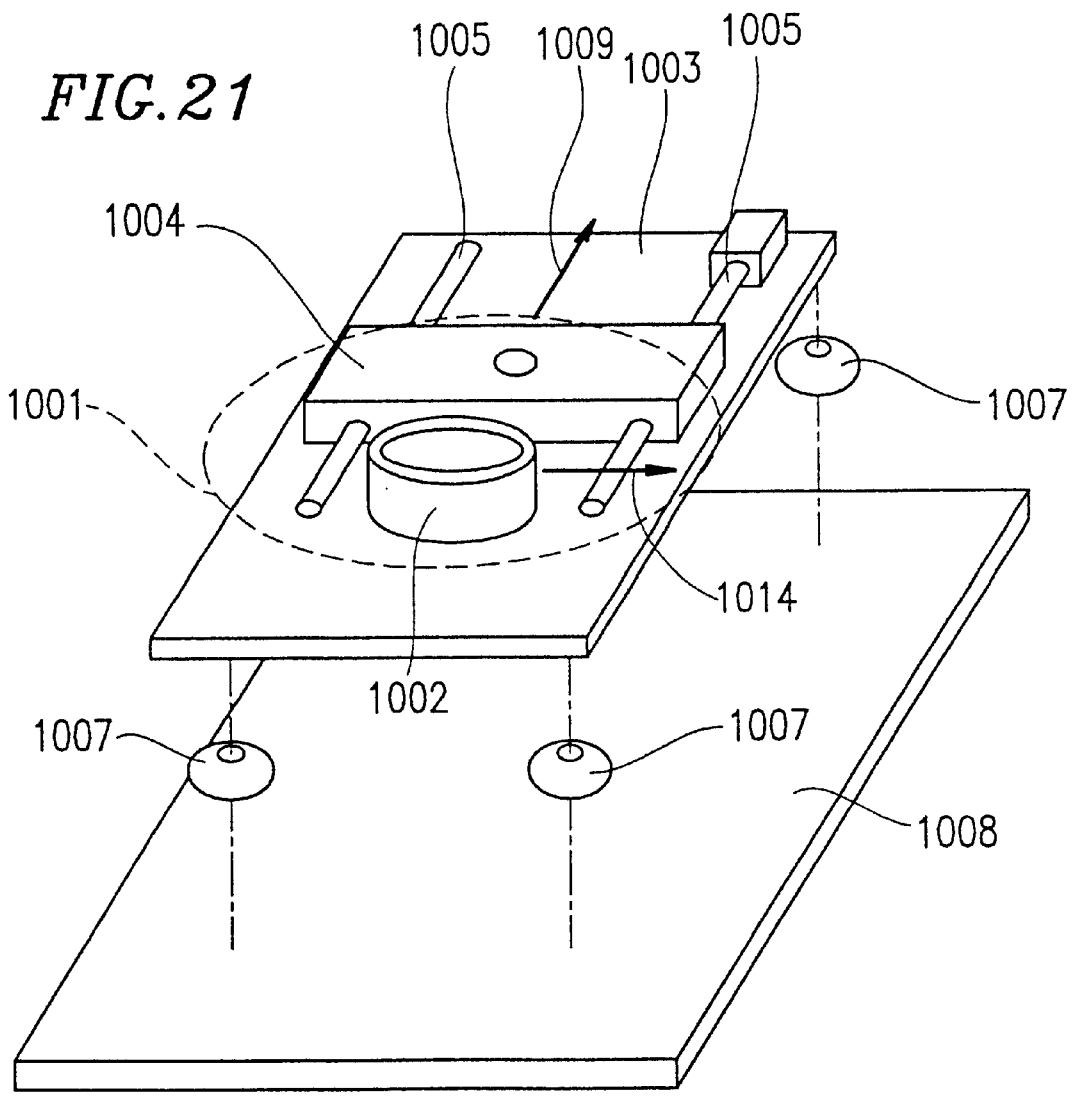
FIG. 21 is a perspective exploded view of a damping mechanism in a conventional disk drive apparatus.

FIG. 20 is a perspective view of Embodiment 17 of a disk drive apparatus 900 according to the present invention.

The basic structure of the disk drive apparatus 900 in Embodiment 17 is substantially the same as that in Embodiment 11 except for the following. In Embodiment 17, the intrinsic vibration frequency in a direction (represented by an arrow 111) in which gravity is applied among the intrinsic vibration frequency of a connecting portion 120 is prescribed to be higher than those in directions (represented by arrows 109 and 110) orthogonal to the gravity direction.

The basic operation of the disk drive apparatus 900 is substantially the same as that in Embodiment 11, except that the movement amount (i.e., weight sinking) of the movable portion 106 with respect to the gravity direction 111 is suppressed. The available space of a damping mechanism in the disk drive apparatus 900 can be effectively utilized, so that a thin disk drive apparatus can be provided.

As described above, the present invention has a structure in which a damping portion is fixed around a movable portion having a disk drive motor (which is a source for vibrating a disk drive apparatus) and a recording/reproducing head, and a chassis is fixed around an outer periphery of the damping portion. Therefore, even in a thin disk drive apparatus, a design flexibility of the damping portion can be increased. As a result, a thin disk drive apparatus with low vibrations and low noise can be realized, in which the mechanical vibrations generated inside the disk drive apparatus can be efficiently attenuated.

Furthermore, by providing two damping portions having different intrinsic vibration frequencies around the movable portion, the mechanical vibrations generated inside the disk drive apparatus can be attenuated by being dispersed in different frequencies.

Furthermore, a damping portion for supporting a disk drive motor and a damping portion for supporting a recording/reproducing head may be independently provided. Therefore, a propagation path for the mechanical vibrations of the disk drive apparatus is divided, whereby the vibrations with a particular mechanical vibration frequency can be attenuated.

Furthermore, by prescribing the cross-sectional shape (size and thickness) of a damping portion to be different in different directions, the mechanical vibrations generated inside the disk drive apparatus can be attenuated by considering the directivity of the vibrations.

Furthermore, due to the structure in which two damping portions have different cross-sectional shapes in different directions, the effect of attenuating the bi-directional mechanical vibrations (i.e., internal vibrations and external disturbance vibrations) of the disk drive apparatus may be enhanced.

Furthermore, since a movable portion is connected to a chassis at a plurality of positions by a plurality of damping portions, the intrinsic vibration frequency of the damping portions can be set at about 100 Hz or less.

Furthermore, by supporting a base by a plurality of damping portions with different sizes, even in the case where the center of gravity of the bass is biased, the space for accommodating vibrations of the base can be equally disposed and minimized under the condition that the base is maintained in a horizontal posture. Thus, a thin disk drive apparatus can be realized.

Furthermore, according to the present invention, by connecting a movable portion to a stationary portion via a flat spring, the movable portion is prevented from sinking due to its weight even in a thin disk drive apparatus, and the movable portion is prevented from bumping into a chassis due to shock. Furthermore, a damping portion is not detached by the application of a load, and the mechanical vibrations generated inside the disk drive apparatus are efficiently attenuated. Thus, a thin disk drive apparatus with low vibrations, low noise, and high endurance can be realized.

Furthermore, by using a connecting portion having a rotary portion in place of a flat spring, the mechanical vibrations can be effectively attenuated while suppressing sink due to weight.

Furthermore, by integrating a stationary portion, a movable portion, and a connecting portion, the number of components may be reduced. The mechanical vibrations can be efficiently attenuated by prescribing both ends of the connecting portion to be in a hinge shape.

Furthermore, by allowing the cross-sectional shape of the connecting portion to have difference in different directions, the intrinsic vibration frequency of the connecting portion in rendered different in a plurality of directions, and the vibration characteristics of the movable portion are provided with anisotropy. Thus, considering the directivity of the mechanical vibrations generated inside the disk drive apparatus, the vibrations can be attenuated.

In the disk drive apparatus of the present invention, vibration resistance and shock resistance can be sufficiently kept, so that information can be satisfactorily recorded onto or reproduced from a disk.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disk drive apparatus, comprising: a movable portion, a stationary portion disposed around the movable portion, and a damping portion disposed between the movable portion and the stationary portion for connection therebetween, the movable portion, the stationary portion, and the damping portion being disposed substantially in a plane, wherein a head for performing at least one of recording or reproducing information with respect to a disk, a head drive portion for moving the head, and a rotation drive portion for driving a disk are provided on the movable portion, and wherein the damping portion includes a plurality of portions having intrinsic vibration frequencies which are different from each other.

2. A disk drive apparatus according to claim 1, wherein the stationary portion is disposed so as to surround the movable portion, an annular gap is formed between the movable portion and the stationary portion, and the damping portion has an annular shape and is disposed in the annular gap.

3. A disk drive apparatus according to claim 1, wherein the damping portion partially connects the movable portion to the stationary portion.

4. A disk drive apparatus according to claim 1, wherein the damping portion is made of, rubber resin or silicon resin.

5. A disk drive apparatus according to claim 1, wherein the damping portion is made of a thermoplastic elastomer.

6. A disk drive apparatus according to claim 1, wherein the movable portion and the stationary portion are made of synthetic resin such an ABS resin and PBT resin.

7. A disk drive apparatus, comprising: a movable portion, a stationary portion disposed around the movable portion, and a damping portion disposed between the movable portion and the stationary portion for connection therebetween, the movable portion, the stationary portion, and the damping portion being disposed substantially in a plane, wherein a head for performing at least one of recording or reproducing information with respect to a disk, a head drive portion for moving the head, and a rotation drive portion for driving a disk are provided on the movable portion, and wherein the damping portion includes a first damping portion connected to the movable portion, a second damping portion connected to the stationary portion, and an intermediate movable portion connecting the first damping portion to the second damping portion.

8. A disk drive apparatus according to claim 7, wherein the intermediate movable portion is made of synthetic resin such as ABS resin or PBT resin.

9. A disk drive apparatus, comprising: a plurality of movable portions disposed separately, a stationary portion having a plurality of openings surrounding the respective movable portions, and a plurality of damping portions which are disposed between the movable portions and inner peripheries of the openings and connect the movable portions to the inner peripheries of the openings, each of the movable portions, each of the openings of the stationary portion, and each of the damping portions being disposed substantially in a first plane, wherein a base is connected to each of the movable portions so as to be in a second plane different from the first plane, and a head for performing at least one of recording or reproducing information with respect to a disk, a head drive portion for moving the head, and a rotation drive portion for driving the disk are provided on the base.

10. A disk drive apparatus according to claim 9, wherein an annular gap is formed between each of the movable portions and the inner periphery of each opening of the stationary portion, and each of the damping portions has an annular shape and is disposed in each of the annular gaps.

11. A disk drive apparatus according to claim 9, wherein each of the damping portions partially connects each of the movable portions to the inner periphery of each of the openings of the station portion.

12. A disk drive apparatus according to claim 9, wherein each of the damping portions is made of rubber resin or silicon resin.

13. A disk drive apparatus according to claim 9, wherein each of the damping portions in made of a thermoplastic elastomer.

14. A disk drive apparatus according to claim 9, wherein each of the movable portions and the stationary portion are made of synthetic resin such as ABS resin and PBT resin.

15. A disk drive apparatus, comprising: a plurality of movable portions disposed separately, a stationary portion having a plurality of openings surrounding the respective movable portions, and a plurality of damping portions which are disposed between the movable portions and inner peripheries of the openings and connect the movable portions to the inner peripheries of the openings, each of the movable portions, each of the openings of the stationary portion, and each of the damping portions being disposed substantially in the plane, wherein a base is connected to each of the movable portions, and a head for performing at least one of recording or reproducing information with respect to a disk, a head drive portion for moving the head, and a rotation drive portion for driving the disk are provided on the base, and wherein each of the damping portions includes a first damping portion connected to each of the movable portions, a second damping portion connected to the inner periphery of each of the openings of the stationary portion, and an intermediate movable portion for connecting the first damping portion to the second damping portion.

16. A disk drive apparatus according to claim 15, wherein each of the intermediate movable portions is made of synthetic resin such as ABS resin and PBT resin.

17. A disk drive apparatus, comprising: a plurality of movable portions disposed separately, a stationary portion having a plurality of openings surrounding the respective movable portions, and a plurality of damping portions which are disposed between the movable portions and inner peripheries of the openings and connect the movable portions to the inner peripheries of the openings, each of the movable portions, each of the openings of the stationary portion, and each of the damping portions being disposed substantially in a plane, wherein a base is connected to each of the movable portions, and a head for performing at least one of recording or reproducing information with respect to a disk, a head drive portion for moving the head, and a rotation drive portion for driving the disk are provided on the base, and wherein each of the damping portions includes a plurality of portions having intrinsic vibration frequencies which are different from each other.

18. A disk drive apparatus, comprising: a movable portion, a stationary portion disposed around the movable portion, and a damping portion and a connecting portion which are disposed between the movable portion and stationary portion for connection therebetween, the movable portion, the stationary portion, and the damping portion being disposed substantially in a plane, wherein a head for performing at least one of recording or reproducing information with respect to a disk, a head drive portion for moving the head in a predetermined direction, and a rotation drive portion for driving the disk are provided on the movable portion, wherein the connecting portion is disposed substantially in the plane together with the movable portion, the stationary portion, and the damping portion, wherein the connecting portion has a first intrinsic vibration frequency in a first direction and a second intrinsic vibration frequency in a second direction which is different from the first direction, and wherein the first intrinsic vibration frequency is lower than the second intrinsic vibration frequency.

19. A disk drive apparatus according to claim 18, wherein the first direction and the second direction are different from each other, and are either of a direction substantially parallel to the plane or a direction substantially orthogonal to the plane.

20. A disk drive apparatus according to claim 18, wherein the first direction and the second direction are different from each other, and are either of a movement direction of the head, a thickness direction of the disk, or a direction substantially orthogonal to the movement direction of the head and the thickness direction of the disk.

21. A disk drive apparatus according to claim 18, wherein the damping portion is made of thermosetting resin or thermoplastic resin.

22. A disk drive apparatus according to claim 18, wherein the connecting portion includes a flat spring.

23. A disk drive apparatus according to claim 18, wherein the connecting portion contains resin.

24. A disk drive apparatus according to claim 18, wherein the connecting portion includes a first cross-sectional portion and a second cross-sectional portion, and the second cross-sectional portion is formed in such a manner that the first intrinsic vibration frequency is lower than the second intrinsic vibration frequency.

25. A disk drive apparatus according to claim 24, wherein a cross-sectional area of the second cross-sectional portion is smaller than a cross-sectional area of the first cross-sectional portion.

26. A disk drive apparatus according to claim 24, wherein the second cross-sectional portion is formed on both ends of the connecting portion.

27. A disk drive apparatus according to claim 24, wherein the second cross-sectional portion is formed at a center of the connecting portion.

28. A disk drive apparatus, comprising: a movable portion, a stationary portion disposed around the movable portion, and a damping portion and a connecting portion which are disposed between the movable portion and the stationary portion for connection therebetween, the movable portion, the stationary portion, and the damping portion being disposed substantially in a plane, wherein a head for performing at least one of recording or reproducing information with respect to a disk, a head drive portion for moving the head in a predetermined direction, and a rotation drive portion for driving the disk are provided on the movable portion, wherein the connecting portion is disposed substantially in the plane together with the movable portion, the stationary portion, and the damping portion, and wherein the connecting portion includes a first pivot portion which pivots with respect to the stationary portion, and a second pivot portion which pivots with respect to the movable portion.

29. A disk drive apparatus according to claim 18, wherein the stationary portion, the movable portion, and the connecting portion are integrally formed with resin.

* * * * *

UNITED STATES PATENT AND TRADEMARK OFFICE
CERTIFICATE OF CORRECTION

PATENT NO. : 6,381,091 B1
DATED : April 30, 2002
INVENTOR(S) : T. Takizawa et al.

Page 1 of 1

It is certified that error appears in the above-identified patent and that said Letters Patent is hereby corrected as shown below:

<u>Column 18,</u>
Line 38, "station" should read -- stationary --.

Signed and Sealed this

Fifteenth Day of October, 2002

Attest:

Attesting Officer

JAMES E. ROGAN
*Director of the United States Patent and Trademark Office*